(12) United States Patent

Kawamura et al.

(10) Patent No.: US 9,136,996 B2
(45) Date of Patent: Sep. 15, 2015

(54) USER DEVICE, BASE STATION, AND COMMUNICATION METHOD FOR MOBILE COMMUNICATION SYSTEM

(75) Inventors: Teruo Kawamura, Yokosuka (JP);
Yoshihisa Kishiyama, Yokosuka (JP);
Nobuhiko Miki, Yokohama (JP);
Mamoru Sawahashi, Yokohama (JP)

(73) Assignee: NTT DOCOMO, INC., Tokyo (JP)

( * ) Notice: Subject to any disclaimer, the term of this patent is extended or adjusted under 35 U.S.C. 154(b) by 298 days.

(21) Appl. No.: 12/996,995

(22) PCT Filed: Jun. 18, 2009

(86) PCT No.: PCT/JP2009/061128
§ 371 (c)(1),
(2), (4) Date: Feb. 23, 2011

(87) PCT Pub. No.: WO2009/157367
PCT Pub. Date: Dec. 30, 2009

(65) Prior Publication Data
US 2011/0188467 A1    Aug. 4, 2011

(30) Foreign Application Priority Data

Jun. 23, 2008  (JP) ................................. 2008-163843

(51) Int. Cl.
*H04W 4/00* (2009.01)
*H04L 5/00* (2006.01)
*H04J 13/00* (2011.01)

(52) U.S. Cl.
CPC ............ *H04L 5/0041* (2013.01); *H04L 5/0053* (2013.01); *H04B 2201/70701* (2013.01); *H04J 13/0059* (2013.01); *H04L 5/0016* (2013.01); *H04L 5/0044* (2013.01)

(58) Field of Classification Search
CPC ... H04L 5/0003; H04L 5/0016; H04L 5/0017; H04L 5/0019; H04L 5/0021
See application file for complete search history.

(56) References Cited

U.S. PATENT DOCUMENTS 7,929,415 B2 *   4/2011   Kwak et al. .................... 370/208
2002/0003786 A1 *   1/2002   Kim et al. ...................... 370/335
(Continued)

FOREIGN PATENT DOCUMENTS

GB    2443460 A    5/2008
JP    2005-286508 A    10/2005
(Continued)

OTHER PUBLICATIONS

Telesystem Innovations (Telesystem Innovations, LTE in a Nutshell: The Physical Layer White Paper, 2010, Telesystem Innovations Inc., pp. 1-18).*

(Continued)

*Primary Examiner* — Brian J Gillis
*Assistant Examiner* — Michael A Keller
(74) *Attorney, Agent, or Firm* — Osha Liang LLP

(57) ABSTRACT

A user device for a mobile communication system employing a multicarrier scheme is disclosed. The user device includes a control signal generating unit for generating a control signal. The user device also includes a transmitting unit for transmitting the control signal to a base station. The control signal sent by the user device is mapped to multiple frequency bands throughout a time period of a subframe but separated from each other in a frequency domain. Each of the frequency bands includes subcarriers used in orthogonal frequency division multiplexing.

9 Claims, 22 Drawing Sheets

(56) References Cited

U.S. PATENT DOCUMENTS

| | | | |
|---|---|---|---|
| 2002/0085619 A1* | 7/2002 | Cho et al. | 375/130 |
| 2003/0063588 A1* | 4/2003 | Lee et al. | 370/335 |
| 2003/0103476 A1* | 6/2003 | Choi et al. | 370/329 |
| 2003/0103481 A1* | 6/2003 | Heo et al. | 370/335 |
| 2005/0233752 A1 | 10/2005 | Laroia et al. | |
| 2005/0250502 A1 | 11/2005 | Laroia et al. | |
| 2006/0171294 A1* | 8/2006 | Son et al. | 370/208 |
| 2007/0223364 A1* | 9/2007 | Terabe et al. | 370/208 |
| 2008/0165873 A1* | 7/2008 | Ghosh et al. | 375/261 |
| 2008/0187068 A1* | 8/2008 | Hashimoto et al. | 375/295 |
| 2008/0279170 A1* | 11/2008 | Malladi et al. | 370/343 |
| 2008/0298315 A1* | 12/2008 | Ihm et al. | 370/329 |
| 2009/0052460 A1* | 2/2009 | Coulas et al. | 370/401 |
| 2009/0073955 A1* | 3/2009 | Malladi | 370/349 |
| 2009/0080382 A1* | 3/2009 | Chen et al. | 370/331 |
| 2009/0316633 A1 | 12/2009 | Kato et al. | |
| 2010/0046413 A1* | 2/2010 | Jin et al. | 370/315 |
| 2010/0074359 A1* | 3/2010 | Tanigawa et al. | 375/267 |
| 2010/0220862 A1* | 9/2010 | Geary et al. | 380/272 |
| 2010/0296477 A1* | 11/2010 | Hason et al. | 370/330 |
| 2010/0304749 A1* | 12/2010 | Dwyer et al. | 455/443 |
| 2011/0009120 A1* | 1/2011 | You et al. | 455/436 |
| 2011/0110326 A1* | 5/2011 | Rexhepi et al. | 370/331 |
| 2011/0294458 A1* | 12/2011 | Tiwari | 455/404.1 |
| 2011/0305219 A1* | 12/2011 | Kim et al. | 370/329 |
| 2012/0269160 A1* | 10/2012 | Kim et al. | 370/329 |

FOREIGN PATENT DOCUMENTS

| | | |
|---|---|---|
| WO | 2005/109709 A1 | 11/2005 |
| WO | 2005109916 A2 | 11/2005 |
| WO | 2006/104353 A2 | 10/2006 |
| WO | 2008/041820 A2 | 4/2008 |
| WO | 2008/048055 A1 | 4/2008 |
| WO | 2008/050574 A1 | 5/2008 |
| WO | 2008/054968 A1 | 5/2008 |

OTHER PUBLICATIONS

Patent Abstracts of Japan, Publication No. 2005-286508, dated Oct. 13, 2005, 1 page.
3GPP TR 25.814 V7.0.0, Jun. 2006, "Physical Layer Aspects for Evolved UTRA," 126 pages.
3GPP TSG RAN WG Meeting #47bis, R1-070103, Sorrento, Italy, Jan. 15-19, 2007, NTT DoCoMo, et a.l., "Downlink L1/L2 Control Signaling Channel Structure: Coding," 9 sheets.
International Search Report issued in PCT/JP2009/061128, mailed on Oct. 6, 2009, w/translation, 7 pages.
Written Opinion issued in PCT/JP2009/061128, mailed on Oct. 6, 2009, 3 pages.
Russian Office Action for Application No. 2011101442/07, mailed on Jan. 15, 2013 (10 pages).
esp@cenet Patent Abstract for WO 2005/109916, publication date Nov. 17, 2005. (2 pages).
Office Action for Chinese Application No. 200980132075.2 dated Apr. 11, 2013, with English translation thereof (17 pages).
Australian Office Action dated Jul. 30, 2013 related to Australian Patent Application No. 2009263425 (4 pages).
Translated Japanese Abstract of WO2005109709 dated Nov. 17, 2005 (1 page).
Extended European Search Report issued in corresponding European Application No. 09770077.7, mailed Apr. 25, 2014 (7 pages).

* cited by examiner

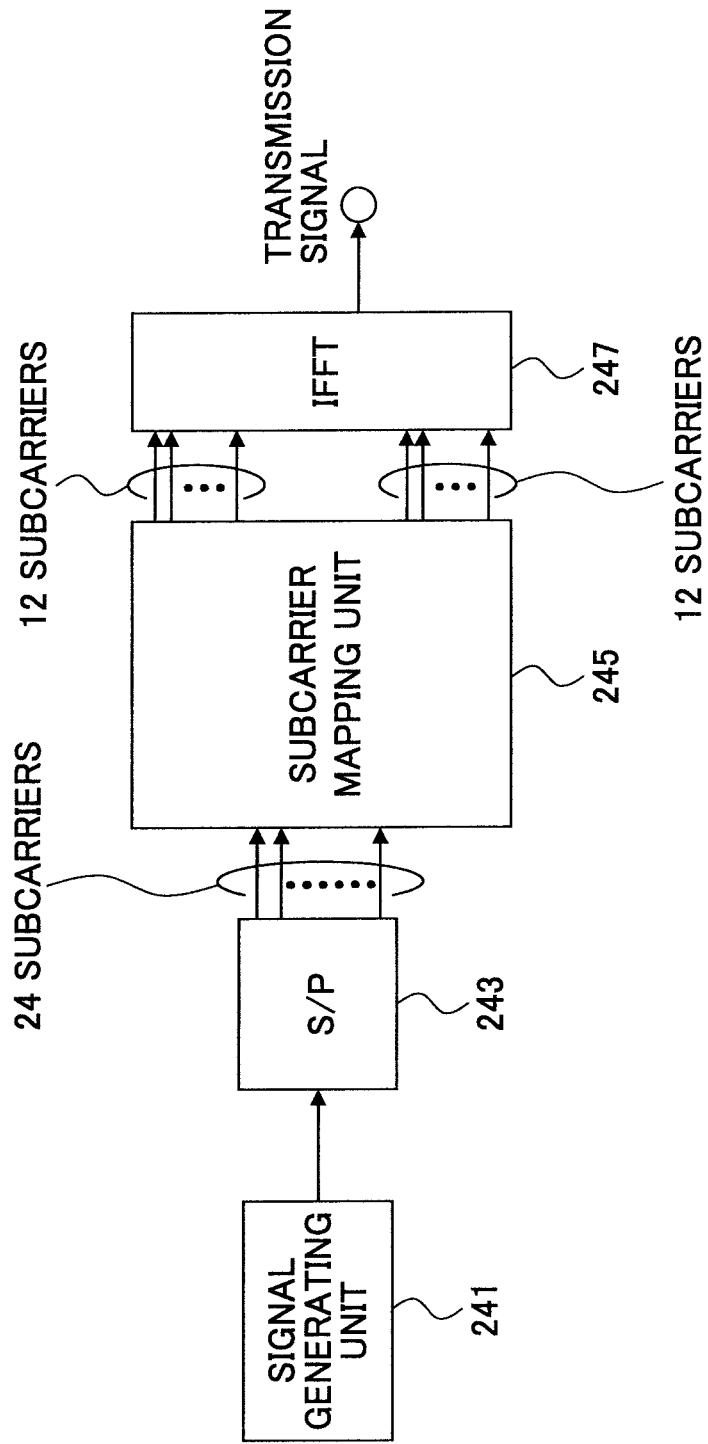

USER DEVICE, BASE STATION, AND COMMUNICATION METHOD FOR MOBILE COMMUNICATION SYSTEM

TECHNICAL FIELD

The present invention generally relates to mobile communication technologies. More particularly, the present invention relates to a base station, a user device, and a communication method for a mobile communication system employing next-generation mobile communication technologies.

BACKGROUND ART

In the field of mobile communication, successors to the third-generation mobile communication system are being discussed by 3GPP, a standardization group for wideband code division multiple access (W-CDMA). For example, Long Term Evolution (LTE) is being discussed as a successor mobile communication system to W-CDMA, high speed downlink packet access (HSDPA), and high speed uplink packet access (HSUPA); and successor mobile communication systems to LTE are also being discussed. Examples of successor mobile communication systems to LTE include an IMT-advanced system, an LTE-advanced system, and a fourth-generation mobile communication system.

In LTE, orthogonal frequency division multiplexing (OFDM) is to be used as a downlink radio access method and single-carrier frequency division multiple access (SC-FDMA) is to be used as an uplink radio access method. However, in other successor mobile communication systems, a multicarrier scheme may be used as an uplink radio access method.

OFDM is a multicarrier transmission scheme where a frequency band is divided into multiple narrow frequency bands (subcarriers) and data are transmitted on the subcarriers. The subcarriers are orthogonalized and densely arranged along the frequency axis to achieve high-speed transmission and improve frequency efficiency.

SC-FDMA is a single carrier transmission scheme where a frequency band is divided into multiple frequency bands in a Fourier-transformed frequency domain and the frequency bands are allocated to different terminals. SC-FDMA makes it possible to easily and effectively reduce interference between terminals as well as to reduce variation of the transmission power. Thus, SC-FDMA is preferable to reduce power consumption of terminals and to achieve wide coverage. SC-FDMA may correspond to a variation of DFT-spread OFDM where a signal is mapped to a continuous frequency band. Use of SC-FDMA for uplink is disclosed, for example, in 3GPP TR 25.814 (V7.0.0) "Physical Layer Aspects for Evolved UTRA", June 2006.

In a mobile communication system such as LTE, one or more resource blocks (RB) or resource units (RU) are allocated to a user device both in downlink and uplink communications. Resource blocks are shared by multiple user devices in the system. In LTE, the base station performs a process called scheduling every subframe (e.g., 1 ms) to select a user device(s) to which resource blocks are to be allocated. A subframe may also be called a transmission time interval (TTI). In downlink, the base station transmits a shared data channel using one or more resource blocks to a user device(s) selected in the scheduling. This data channel is called a physical downlink shared channel (PDSCH). In uplink, a user device(s) selected in the scheduling transmits a shared channel to the base station using one or more resource blocks. This shared channel is called a physical uplink shared channel (PUSCH).

In a communication system employing shared channels, it is necessary to signal (or report) allocation information of the shared channels to user devices basically every subframe. A downlink control channel used for this signaling is called a physical downlink control channel (PDCCH) or a downlink L1/L2 control channel. A downlink control signal may include, in addition to the PDCCH, a physical control format indicator channel (PCFICH) and a physical hybrid ARQ indicator channel (PHICH).

The PDCCH, for example, includes the following information (see, for example, 3GPP R1-070103, Downlink L1/L2 Control Signaling Channel Structure: Coding):
Downlink scheduling grant (information)
Uplink scheduling grant
Overload indicator
Transmission power control command bit The downlink scheduling information may include information regarding a downlink shared channel. For example, the downlink scheduling information may include downlink resource block allocation information, identification information of user devices (UE IDs), the number of streams, information regarding precoding vectors, data sizes, modulation schemes, and information regarding hybrid automatic repeat request (HARQ).

The uplink scheduling grant may include information regarding an uplink shared channel. For example, the uplink scheduling grant includes uplink resource allocation information, identification information of user devices (UE IDs), data sizes, modulation schemes, uplink transmission power information, and information regarding a demodulation reference signal used in uplink MIMO.

The PCFICH is used to report the format of the PDCCH. More specifically, the PCFICH is used to report the number of OFDM symbols to which the PDCCH is mapped. In LTE, the number of OFDM symbols to which the PDCCH is mapped is one, two, or three. The PDCCH is mapped to OFDM symbols at the beginning of a subframe.

The PHICH includes acknowledgement/negative-acknowledgement information (ACK/NACK) indicating whether retransmission is necessary for the PUSCH transmitted via uplink. The PHICH indicates acknowledgement or negative acknowledgement for each transmission unit such as a packet and therefore can be basically represented by one bit. Since it is not efficient to wirelessly transmit each PHICH as is, PHICHs for multiple users are combined to form multi-bit information and the multi-bit information is code-division-multiplexed and transmitted wirelessly.

PDCCH, PCFICH, and PHICH may be defined as independent channels or PDCCH may be defined to include PCFICH and PHICH.

In uplink, the PUSCH is used to transmit user data (i.e., a normal data signal) and control information accompanying the user data. Also, separately from the PUSCH, a physical uplink control channel (PUCCH) is provided to transmit, for example, a downlink channel quality indicator (CQI) and acknowledgement/negative-acknowledgement information (ACK/NACK) for the PDSCH. The CQI is used, for example, for scheduling and adaptive modulation and channel coding (AMC) of the physical downlink shard channel. In uplink, a random access channel (RACH) and signals indicating allocation requests for uplink and downlink radio resources may also be transmitted as necessary.

DISCLOSURE OF INVENTION

Problems to be Solved by the Invention

A single-carrier scheme is more preferable than a multi-carrier scheme in terms of reducing the peak-to-average power ratio (PAPR). Particularly, reducing the PAPR is important for user devices at the cell edge. Meanwhile, it may not be so important to reduce the PAPR for user devices near the base station or with good channel conditions. For example, for user devices with sufficient transmission power, it may be more important to efficiently and reliably transmit a large amount of information. For such user devices, it is preferable to transmit a signal using a multicarrier scheme. However, in LTE mobile communication systems, although OFDM is used for downlink, a single-carrier scheme is used for uplink. Also, use of a multicarrier scheme for uplink in current and future mobile communication systems has not been fully studied yet.

An aspect of the present invention makes it possible to efficiently transmit at least an uplink control signal in a mobile communication system employing a multicarrier scheme.

Means for Solving the Problems

An aspect of the present invention provides a user device for a mobile communication system employing a multicarrier scheme. The user device includes a control signal generating unit generating a control signal and a transmitting unit transmitting the control signal to a base station. The control signal is mapped to multiple frequency bands that are provided across a subframe but discontinuous in the frequency domain. Each of the frequency bands includes subcarriers used in orthogonal frequency division multiplexing (OFDM).

Advantageous Effect of the Invention

An aspect of the present invention makes it possible to efficiently transmit at least an uplink control signal in a mobile communication system employing a multicarrier scheme.

BRIEF DESCRIPTION OF THE DRAWINGS

FIG. 24A is a partial functional block diagram of an exemplary user device;

BEST MODE FOR CARRYING OUT THE INVENTION

Although descriptions of the present invention are divided into the following sections, the distinctions between those sections are not essential for the present invention, and the descriptions in two or more sections may be combined as necessary. Although specific values are used in the descriptions below to facilitate the understanding of the present invention, the values are just examples and any other appropriate values may also be used unless otherwise mentioned.

A. System
B. Transmission method of uplink control channel
C. Uplink control channel (OFDM)
D. Uplink control channel (DFT-spread OFDM)
E. Uplink data channel (OFDM)
F. Uplink data channel (DFT-spread OFDM)
G. Configuration of control channel (block modulation)
H. Configuration of control channel (non-block modulation)
I. User device
J. Base station <<First Embodiment>>
<A. System>

Figure 1:
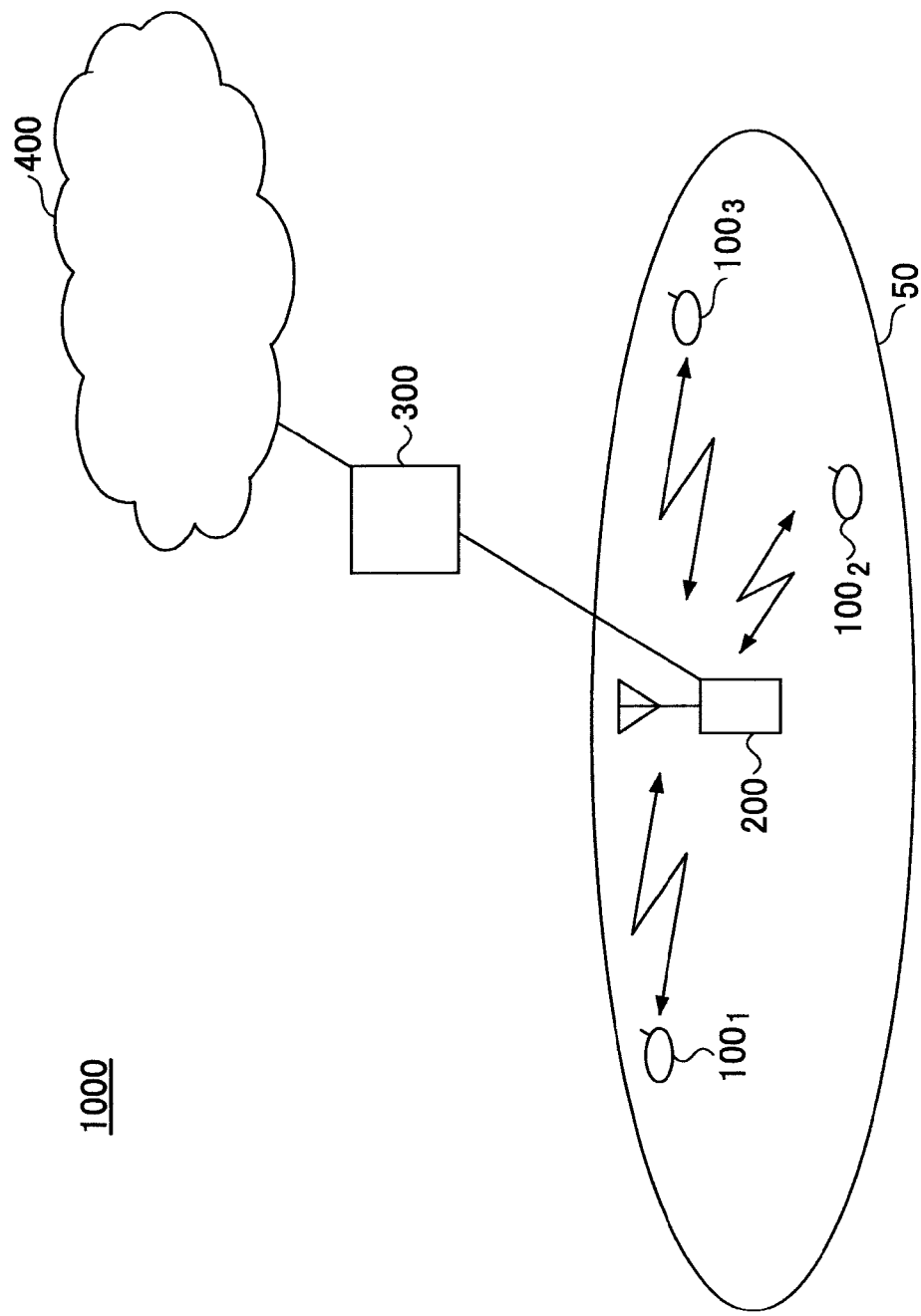
FIG. 1 is a schematic diagram of a mobile communication system.

FIG. 1 is a schematic diagram of a mobile communication system 1000. The mobile communication system 1000 includes a cell 50; user devices (user equipment: UE) $100_1$, $100_2$, and $100_3$ (may also be called the user device 100 and the user devices 100); a base station 200 wirelessly communicating with the user devices 100, an upper node 300 connected to the base station 200, and a core network 400 connected to the upper node 300. The upper node 300 is, for example, a radio network controller (RNC), an access gateway (aGW), or a mobility management entity (MME). In the mobile communication system 1000 of this embodiment, a multicarrier scheme is used for both uplink and downlink. Although any appropriate multicarrier scheme may be used, OFDM or DFT-spread OFDM is preferably used in this embodiment. Also, the mobile communication system 1000 may use both a single-carrier scheme and a multicarrier scheme. For example, OFDM may be used in an area where radio propagation conditions are good (e.g., an area near a base station), and a single-carrier scheme (SC-FDMA) may be used in an area where radio propagation conditions are poor (e.g., an area near the cell edge).

In the descriptions below, it is assumed that the user device 100 transmits control information to the base station 200, and the control information includes uplink L1/L2 control information, acknowledgement/negative-acknowledgement information (ACK/NACK) for a data channel transmitted via downlink, and/or a channel quality indicator (CQI) indicating downlink channel conditions. However, the control information may include any other appropriate information.

Below, control information transmission methods according to an embodiment of the present invention are described. The control information transmission methods described below are examples and do not encompass the entire scope of the present invention.

<B. Control Information Transmission Method>
(Method 1)

Figure 2:
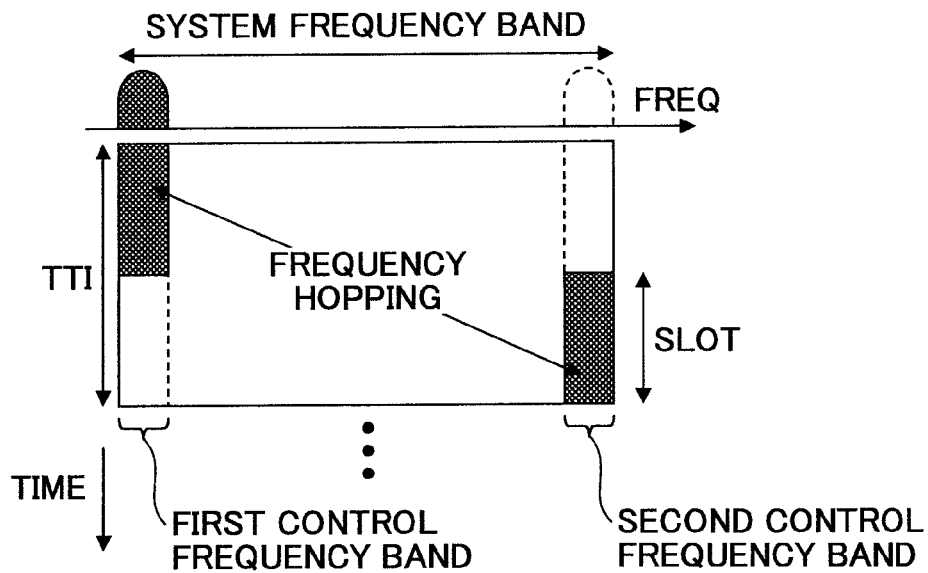
FIG. 2 is a drawing illustrating a control information transmission method (1)

FIG. 2 is a drawing illustrating a control information transmission method (1). In this example, two narrow frequency bands are provided at the right and left ends of a system frequency band including multiple (frequency) resource blocks. The system frequency band, for example, has a bandwidth of 5 MHz, 10 MHz, or 20 MHz. The two frequency bands at the right and left ends are reserved for transmission of control information. Here, for descriptive purposes, the frequency band at the low frequency end is called a first control frequency band and the frequency band at the high frequency end is called a second control frequency band. For example, one resource block has a bandwidth of about 180 kHz, and each of the first and second control frequency bands has a bandwidth corresponding to the bandwidth of one resource block. For example, when the system bandwidth is 5 MHz, the system frequency band includes 25 resource blocks (#1-#25), a first resource block #1 corresponds to the first control frequency band, and a twenty-fifth resource block #25 corresponds to the second control frequency band. One radio frame, for example, includes a predetermined number (e.g., 10) of 1-ms subframes. Each subframe includes, for example, two 0.5-ms slots.

However, these values are just examples, and any other appropriate values may be used. The system frequency band is also called a basic frequency band and the entire frequency band may include one or more basic frequency bands.

In the example shown in FIG. 2, control information is transmitted from user A to the base station in first and second slots that are consecutive. The first control frequency band is used in the first slot and the second control frequency band is used in the second slot. Thus, control information is transmitted according to a frequency hopping pattern using frequency bands that are widely apart from each other in the system bandwidth. This method makes it possible to achieve a high frequency diversity gain and is therefore preferable to improve the reception quality of control information. In this example, frequency hopping is performed by changing frequency bands every slot. However, frequency bands may be changed less frequently (e.g., every subframe) or more frequently (e.g., every symbol in a slot). Since the first and second control frequency bands are not used at the same time, this method may also be applied to a system employing a single-carrier scheme. As described above, in this embodiment, one subframe corresponds to one TTI. However, this is not essential for the present invention.

(Method 2)

Figure 3:
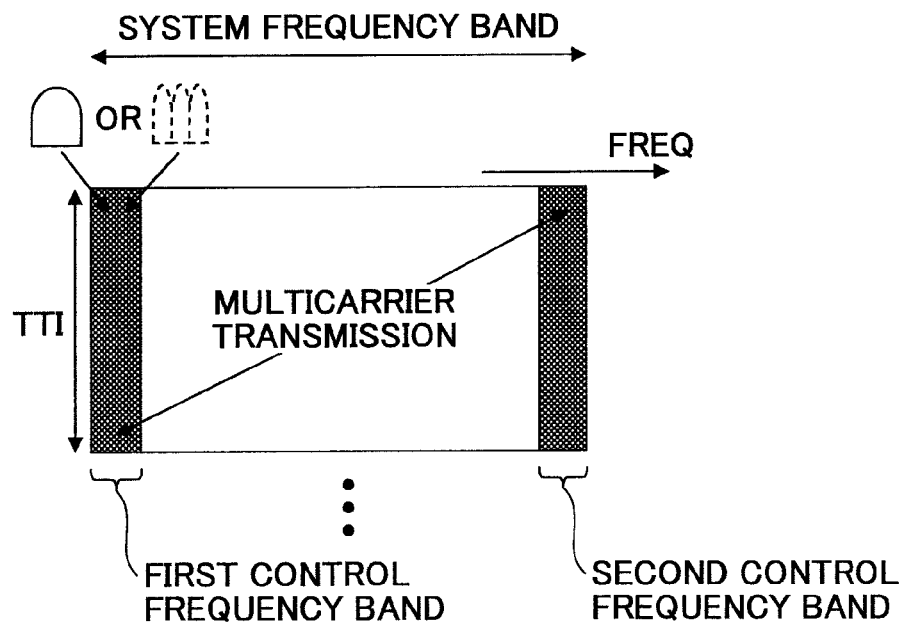
FIG. 3 is a drawing illustrating a control information transmission method (2)

FIG. 3 is a drawing illustrating a control information transmission method (2). In FIG. 3, similarly to FIG. 2, control information is transmitted from user A to the base station using the first and second control frequency bands. In this method, however, the first and second control frequency bands are used at the same. This method is applicable only to a system employing a multicarrier scheme. Since the first and second control frequency bands are used throughout the subframe (or two slots), this method provides transmission capacity greater than that provided by the method of FIG. 2. This method is preferable when the number of symbols or bits of control information of each user is large, when the number of multiplexed users is large, or when the radio propagation conditions are poor. When the channel conditions are good, it is possible to achieve desired quality without much increasing the size of data having a given number of bits. However, when the radio propagation conditions are poor, it is necessary to increase a redundant signal to achieve desired quality and as a result, the size of data increases. Therefore, the method (2) is preferable when the radio propagation conditions are poor.

In this embodiment, either OFDM or DFT-spread OFDM may be used for communications based on a multicarrier scheme. A single-carrier scheme is more preferable than a multicarrier scheme in terms of reducing the peak power. Similarly, DFT-spread OFDM is more preferable than OFDM in terms of reducing the peak power. This is due to the difference in the number of subcarriers.

<C. Uplink Control Channel (OFDM)>
(Method 3)

Figure 4:
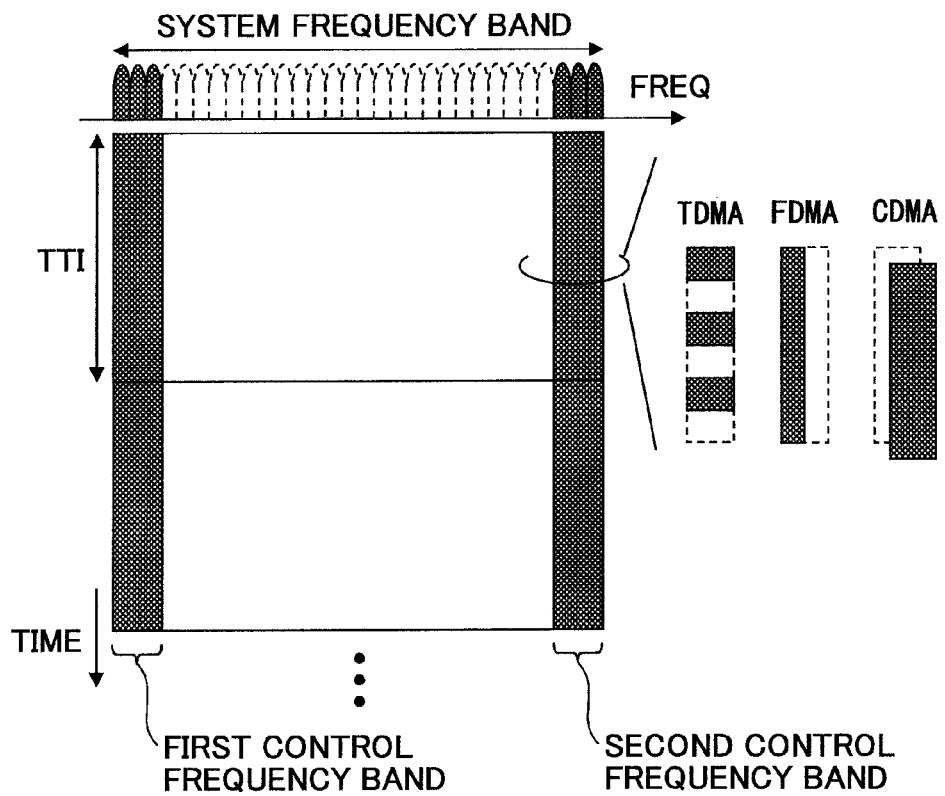
FIG. 4 is a drawing illustrating a control information transmission method (3)

FIG. 4 is a drawing illustrating a control information transmission method (3). In this method, control information is transmitted according to OFDM. Let us assume that each of the first and second control frequency bands corresponds to one resource block, and one resource block has a bandwidth of 180 kHz and includes 12 OFDM subcarriers (one subcarrier=15 kHz). Based on this assumption, 12 subcarriers are provided for transmission of control information in each of the first and second control frequency bands (a total of 24 subcarriers).

The first and second control frequency bands are used by one or more user devices. Any known multiplexing method may be used to multiplex users. In this embodiment, frequency division multiple access (FDMA), code division multiple access (CDMA), or time division multiple access (TDMA) is used to multiplex users.

(Method 4—FDMA)

Figure 5:
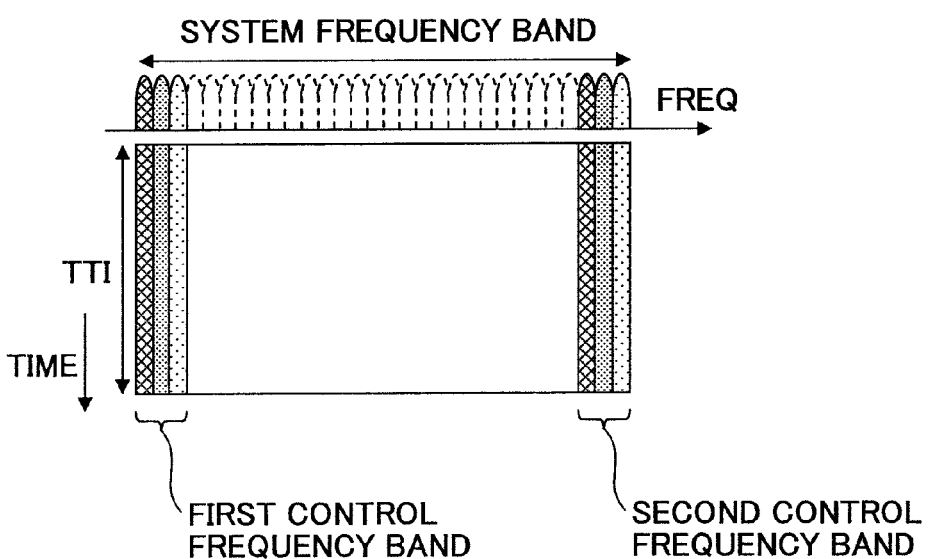
FIG. 5 is a drawing illustrating a control information transmission method (4)

FIG. 5 is a drawing illustrating a control information transmission method (4): FDMA. In FIG. 5, multiple subcarriers are divided by the number of multiplexed users. Based on the assumption described in the method (3), when three users are to be multiplexed, 12/3=4 subcarriers are allocated to each user in the first control frequency band. Similarly, 12/3=4 subcarriers are allocated to each user in the second control frequency band. Control information of each user is mapped to the subcarriers allocated by FDMA and transmitted.

(Method 5—CDMA)

Figure 6:
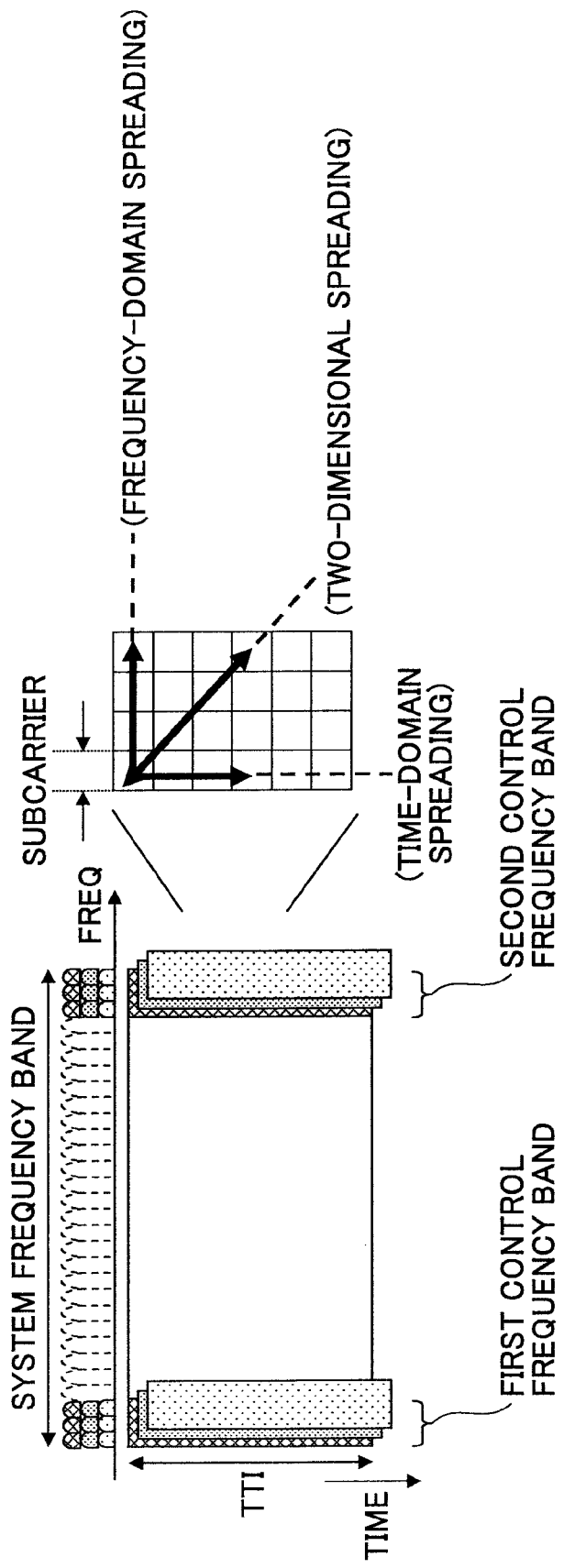
FIG. 6 is a drawing illustrating a control information transmission method (5)

FIG. 6 is a drawing illustrating a control information transmission method (5): CDMA. In this method, control information of each user is spread by a unique spreading code and mapped to all subcarriers in the first and second control frequency bands. Spreading may be performed only in the frequency or time direction or both in the frequency and time directions.

(Method 6—TDMA)

Figure 7A:
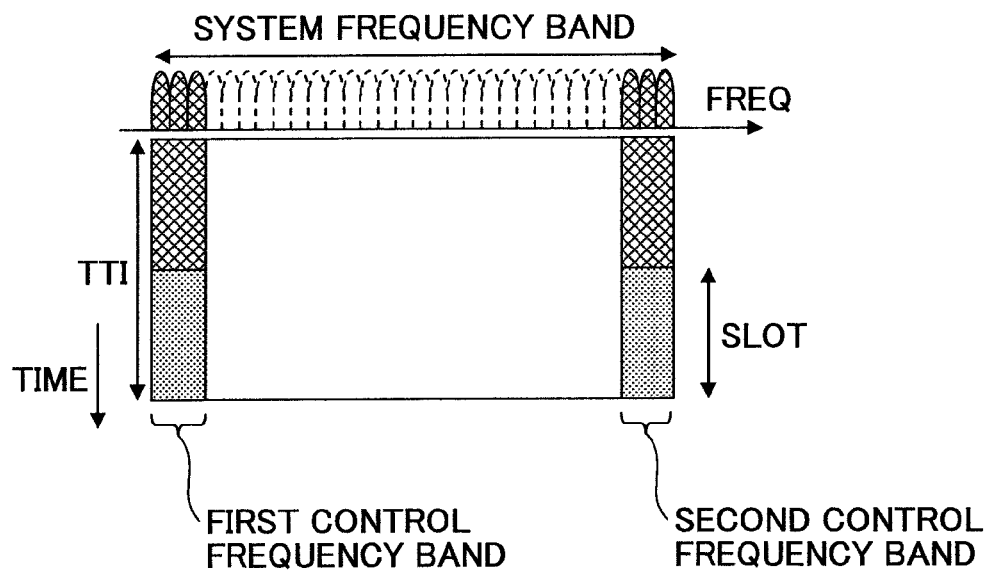
FIG. 7A is a drawing illustrating a control information transmission method (6)
Figure 8:
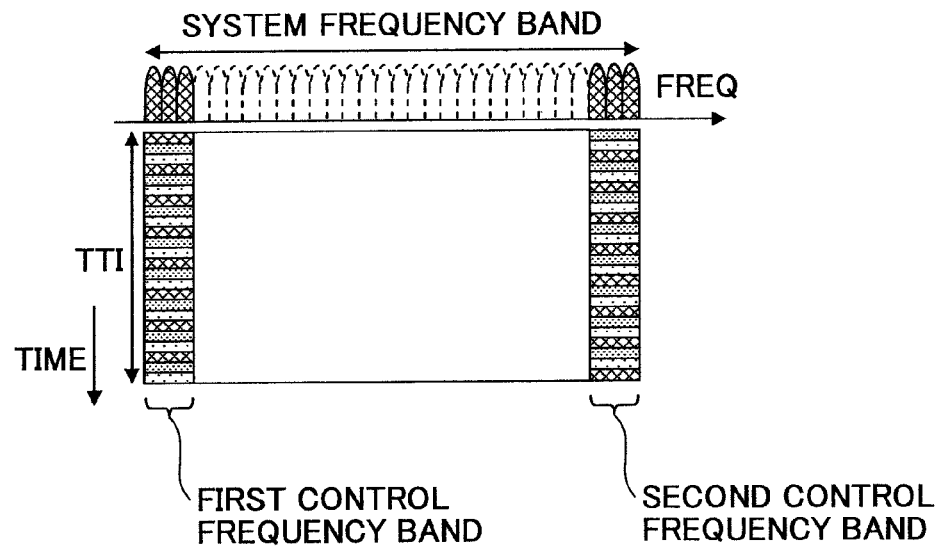
FIG. 8 is a drawing illustrating a variation of the control information transmission method (6)

FIG. 7A is a drawing illustrating a control information transmission method (6): TDMA. In this method, one subframe is divided into first and second slots, and different sets of information are transmitted in the first slot and the second slot in each of the first and second control frequency bands. Control information of each user is mapped to a time period allocated by TDMA and transmitted. One subframe may also be divided by TDMA into any appropriate time periods other than slots. For example, as shown in FIG. 8, one subframe may be divided into time periods corresponding to OFDM symbols. However, it is preferable to transmit control information of each user within a continuous short time period (one half of TTI, i.e., one slot) as shown in FIG. 7A in order to reduce delay for the user.

(Method 7—TDMA/FDMA)

It is also possible to combine TDMA and FDMA.

Figure 7B:
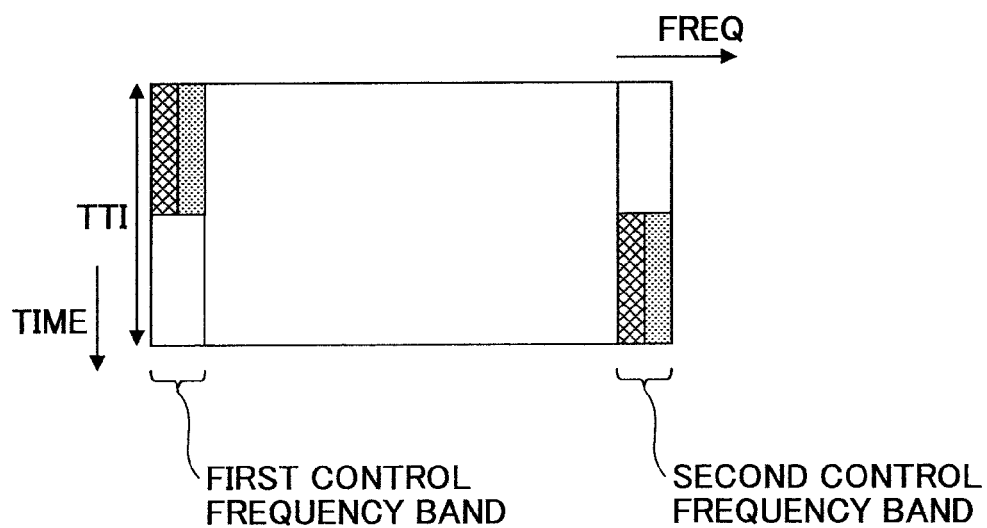
FIG. 7B is a drawing illustrating a control information transmission method (7)

FIG. 7B is a drawing illustrating a combination of TDMA and FDMA. As shown in FIG. 7B, one subframe is divided into first and second slots, and different sets of information are transmitted in the first slot and the second slot in each of the first and second control frequency bands. In this method, FDMA is also applied to each slot. Although each of the first and second control frequency bands is divided into two frequency bands in FIG. 7B, the first and second control frequency bands may be divided into any number of frequency bands.

<D. Uplink Control Channel (DFT-Spread OFDM)>

(Method 8)

Figure 9:
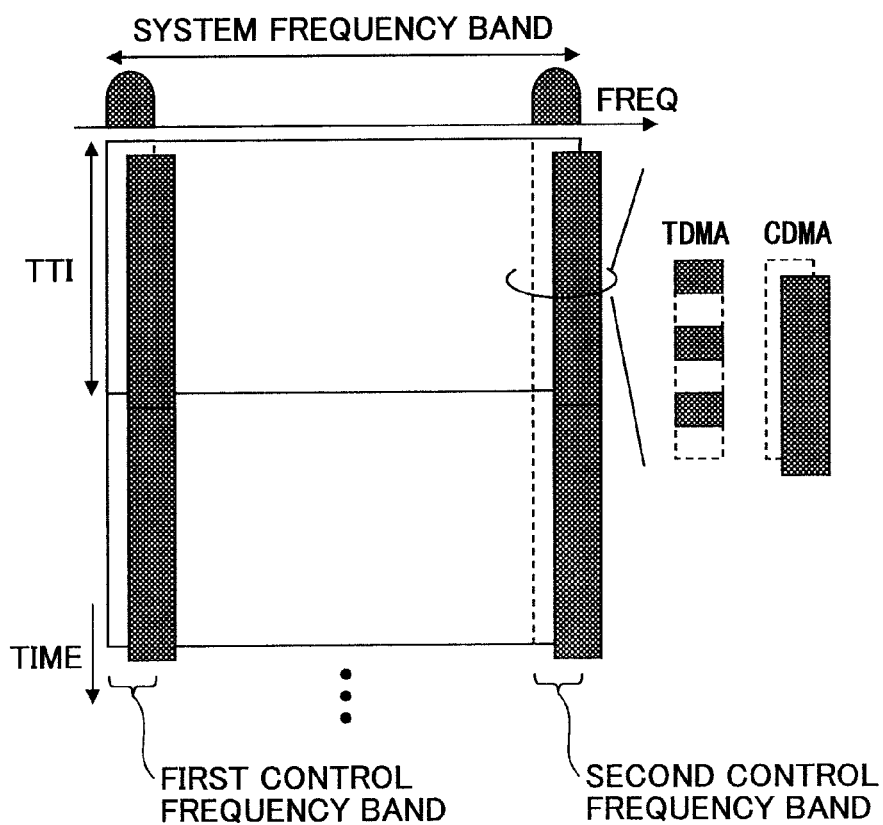
FIG. 9 is a drawing illustrating a control information transmission method (8)

FIG. 9 is a drawing illustrating a control information transmission method (8). In this method, control information is transmitted using DFT-spread OFDM. In DFT-spread OFDM, a signal before transmission is discrete-Fourier-transformed, the transformed signal is mapped to one or more frequency ranges in the frequency domain, and the mapped signal is inverse-Fourier-transformed for transmission. Thus, with DFT-spread OFDM, both a single-carrier signal and a multicarrier signal can be generated. In the example below, DFT-spread OFDM is performed such that a control signal is mapped to both of the first and second control frequency bands. Let us assume that each of the first and second control frequency bands corresponds to one resource block, and one resource block has a bandwidth of 180 kHz.

In this method, both of the first and second control frequency bands are used to transmit control information of a user, but a single-carrier scheme is used in each of the first and second control frequency bands. More specifically, control information of one user is transmitted using two subcarriers. That is, two single-carrier signals are transmitted in parallel. In terms of reducing the peak-to-average power ratio (PAPR), this method is more preferable than the method of FIG. 4 where a multicarrier signal is generated as a prerequisite.

The first and second control frequency bands are used by one or more user devices. Any known multiplexing method may be used to multiplex users. In this embodiment, code division multiple access (CDMA) or time division multiple access (TDMA) is used to multiplex users.

(Method 9—CDMA)

Figure 10:
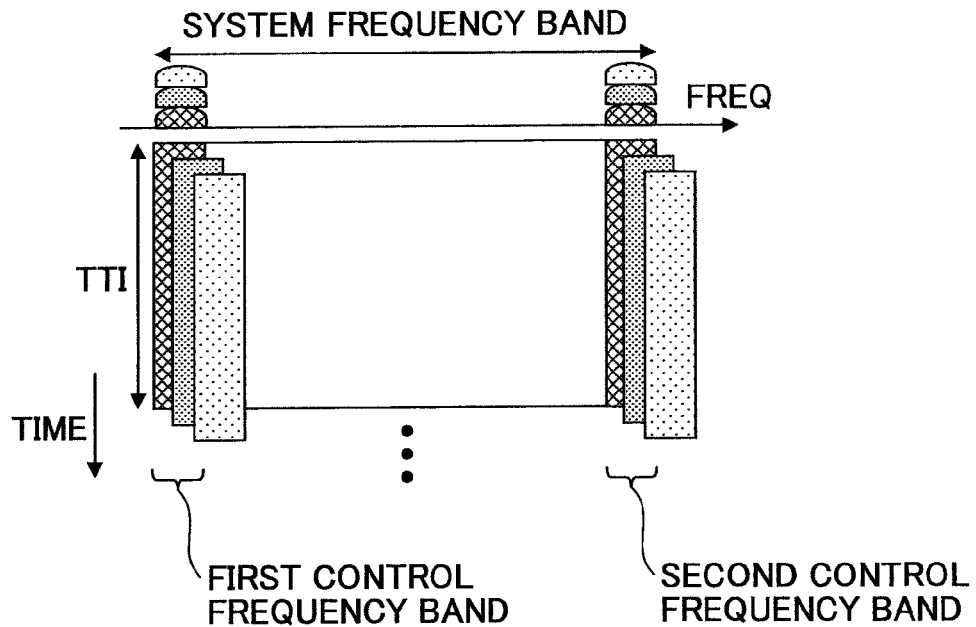
FIG. 10 is a drawing illustrating a control information transmission method (9)

FIG. 10 is a drawing illustrating a control information transmission method (9): CDMA. In this method, similarly to the method of FIG. 6, control information of each user is spread by a unique spreading code and mapped to the first and second control frequency bands. However, the method of FIG. 10 is different from the method of FIG. 6 in that a single carrier scheme is used to transmit control information in each of the first and second control frequency bands.

(Method 10)

Figure 11:
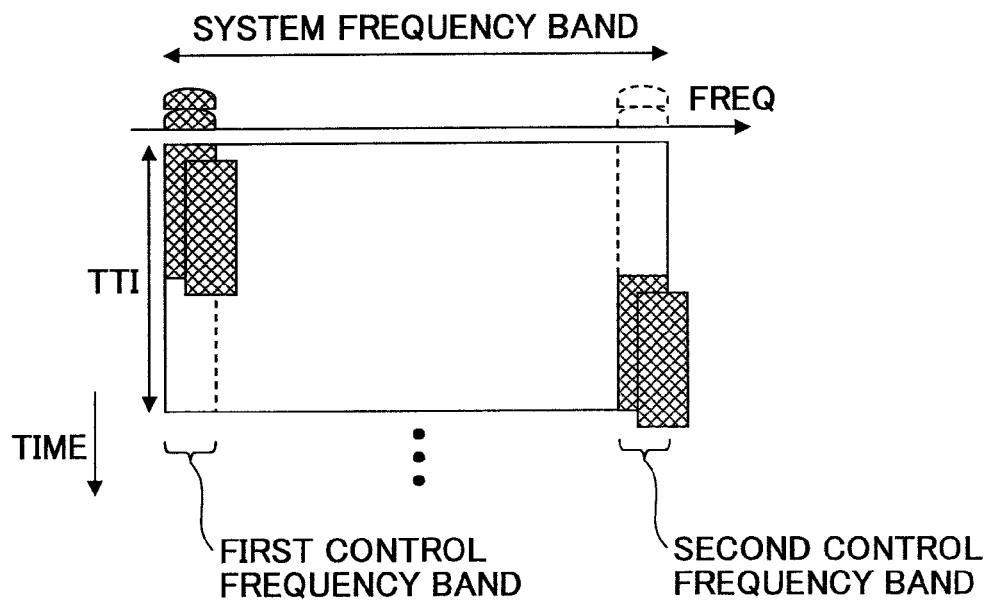
FIG. 11 is a drawing illustrating a control information transmission method (10)

FIG. 11 is a drawing illustrating a control information transmission method (10). In FIG. 10, sets of control information of different users are code-division-multiplexed. Meanwhile, in FIG. 11, sets of control information of the same user are code-division multiplexed. For example, ACK/NACK and a CQI of the same user are code-division-multiplexed for transmission.

(Method 11)

Figure 12:
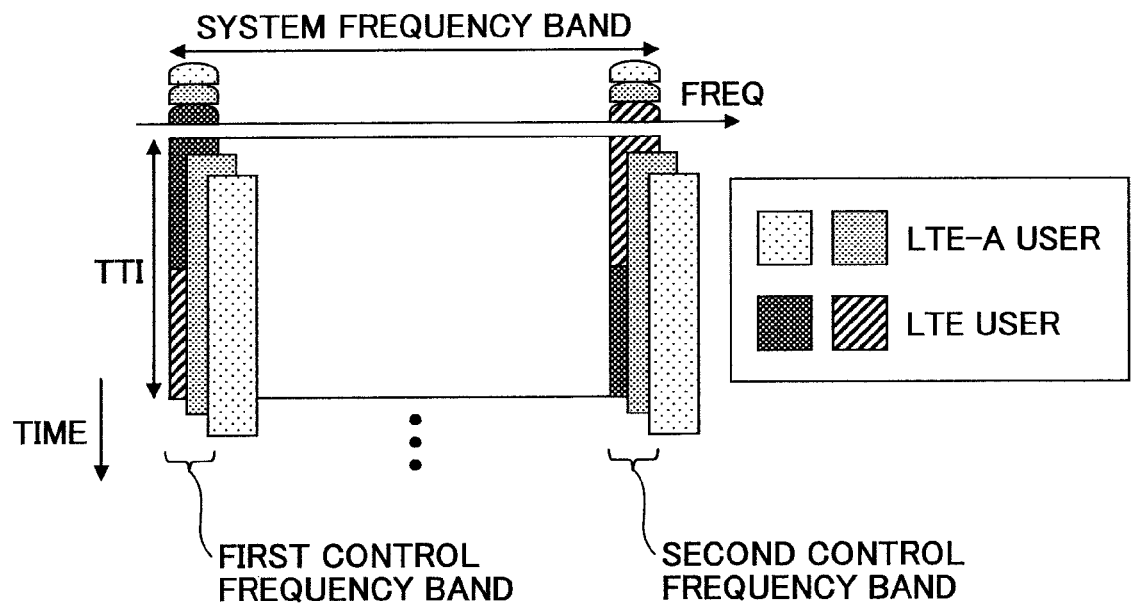
FIG. 12 is a drawing illustrating a control information transmission method (11)

FIG. 12 is a drawing illustrating a control information transmission method (11). Also in this method, sets of control information of different users are code-division-multiplexed. In FIG. 12, users of a system (e.g., an LTE system) where control information is transmitted by a single-carrier scheme as shown in FIG. 2 and users of a system (e.g., an LTE-advanced (LTE-A) system) where control information is transmitted by a multicarrier scheme are code-division-multiplexed in the same subframe. Control information is transmitted by a single carrier scheme in each of the first and second control frequency bands. That is, although a multicarrier scheme is used in this method, signals are transmitted, in effect, by a single-carrier scheme in each of the two frequency bands at the right and left ends of the system frequency band. Therefore, when only the first control frequency band is considered, signals of both systems are transmitted by a single-carrier scheme. Similarly, when only the second control frequency band is considered, signals of both systems are transmitted by a single-carrier scheme. Thus, this method makes it possible to code-division-multiplex signals of users of new and old systems. When an old system employs a single-carrier scheme and a new system employs OFDM, it is difficult to multiplex control information of those systems by a normal code division multiplexing method. Meanwhile, a user multiplexing method based on a single-carrier scheme and CDM makes it possible to improve the compatibility (backward compatibility) of a new system with an old system.

(Method 12—TDMA)

Figure 13:
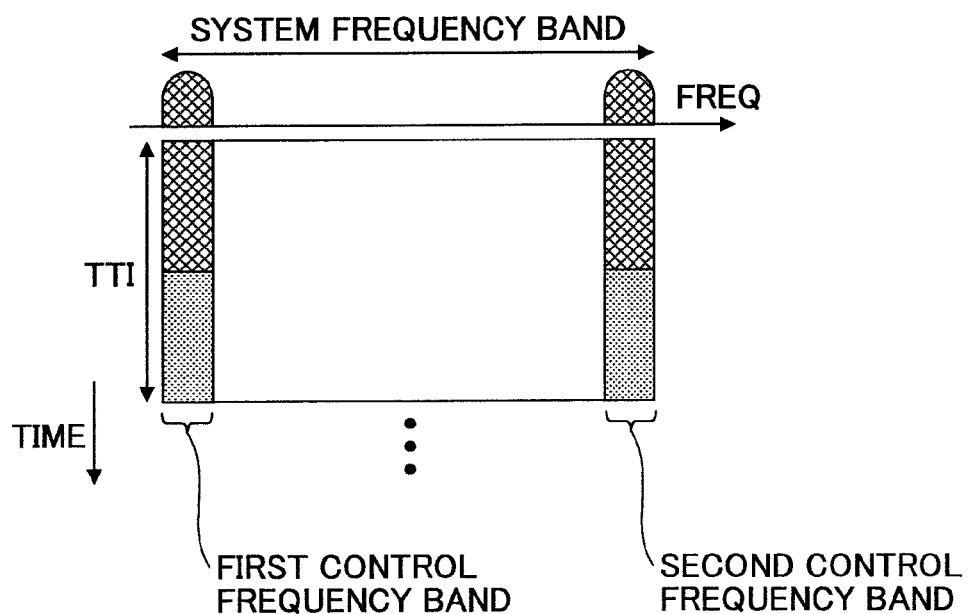
FIG. 13 is a drawing illustrating a control information transmission method (12)

FIG. 13 is a drawing illustrating a control information transmission method (12): TDMA. In this method, one subframe is divided into first and second slots, and different sets of information are transmitted in the first slot and the second slot. Control information of each user is mapped to a time period allocated by TDMA and is transmitted. The subframe may be divided by TDMA not only into slots but into any other appropriate time periods. For example, as shown in FIG. 8, one subframe may be divided into time periods corresponding to OFDM symbols. However, it is preferable to transmit control information of each user within a continuous short time period (one half of TTI, i.e., one slot) as shown in FIG. 13 in order to reduce delay for the user.

(Method 13)

Figure 14:
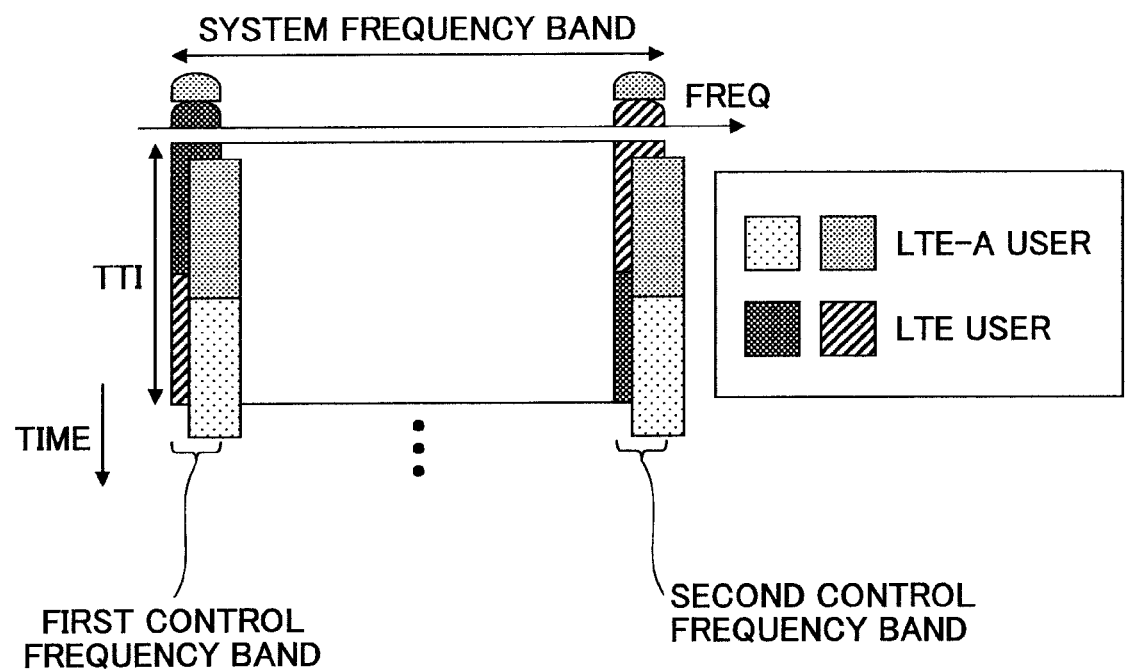
FIG. 14 is a drawing illustrating a control information transmission method (13)

FIG. 14 is a drawing illustrating a control information transmission method (13). In FIG. 12, LTE-A users are code-division-multiplexed. Meanwhile, in the example shown in FIG. 14, LTE-A users are time-division-multiplexed. Also, LTE users and LTE-A users are code-division-multiplexed in a manner similar to FIG. 12. This method is preferable to improve the compatibility (backward compatibility) of a new system with an old system as well as to reduce delay for LTE-A users.

<E. Using Same Frequency Band as Uplink Data Channel>

Uplink control information may be transmitted separately from a data channel or together with a data channel.

(Method 14)

Figure 15:
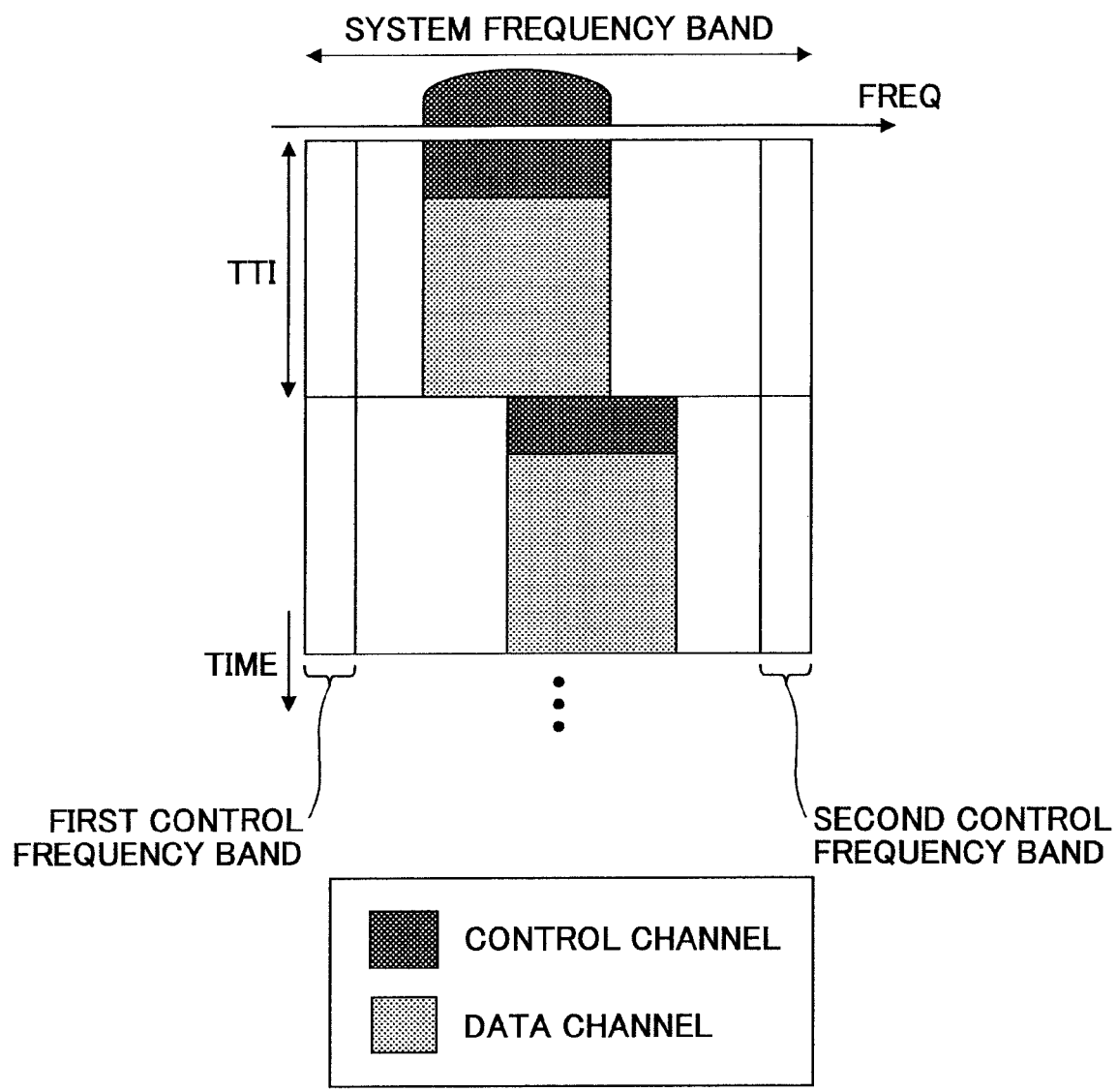
FIG. 15 is a drawing illustrating a control information transmission method (14)

FIG. 15 is a drawing illustrating a control information transmission method (14). In FIG. 15, a data channel is mapped to a continuous frequency band according to DFT-spread OFDM and transmitted via uplink. This corresponds to a case where a data channel is transmitted using one or more adjacent resource blocks in an LTE system. In the method of FIG. 15, however, control information is also transmitted using the resource blocks of the data channel. Since the resource blocks are consecutive, a single-carrier method can be used for transmission.

(Method 15)

Figure 16:
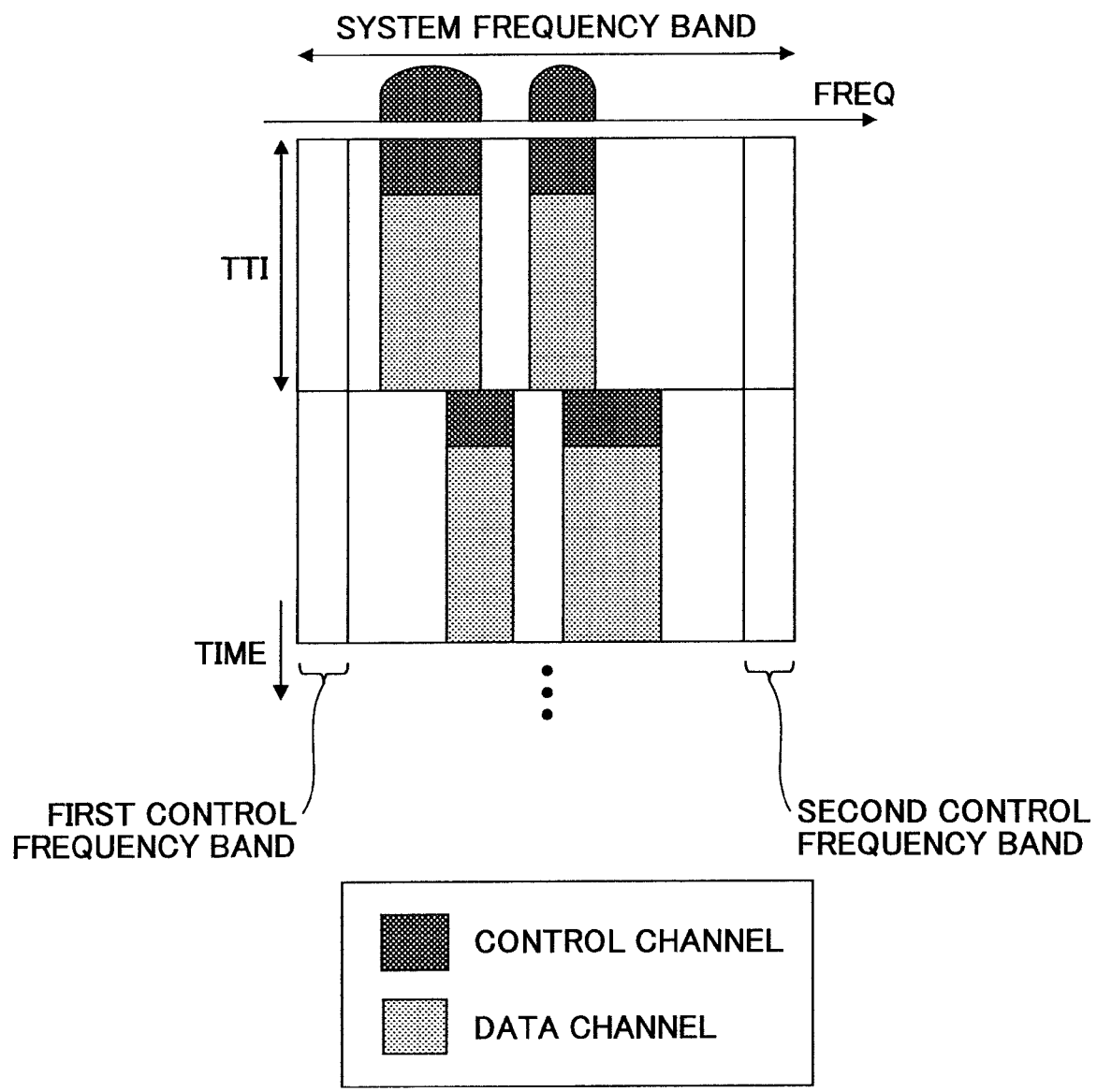
FIG. 16 is a drawing illustrating a control information transmission method (15)

FIG. 16 is a drawing illustrating a control information transmission method (15). Also in this method, control information is transmitted using the resource blocks of a data channel and the data channel is mapped to frequency bands according to DFT-spread OFDM. In this method, however, the data channel is not mapped to a continuous frequency band, but mapped to multiple frequency bands that are not continuous in the frequency domain. In this case, the single-carrier scheme cannot be used for transmission and at least two subcarriers are necessary for transmission (i.e., one or more subcarriers are necessary for each continuous frequency band).

(Method 16)

Figure 17:
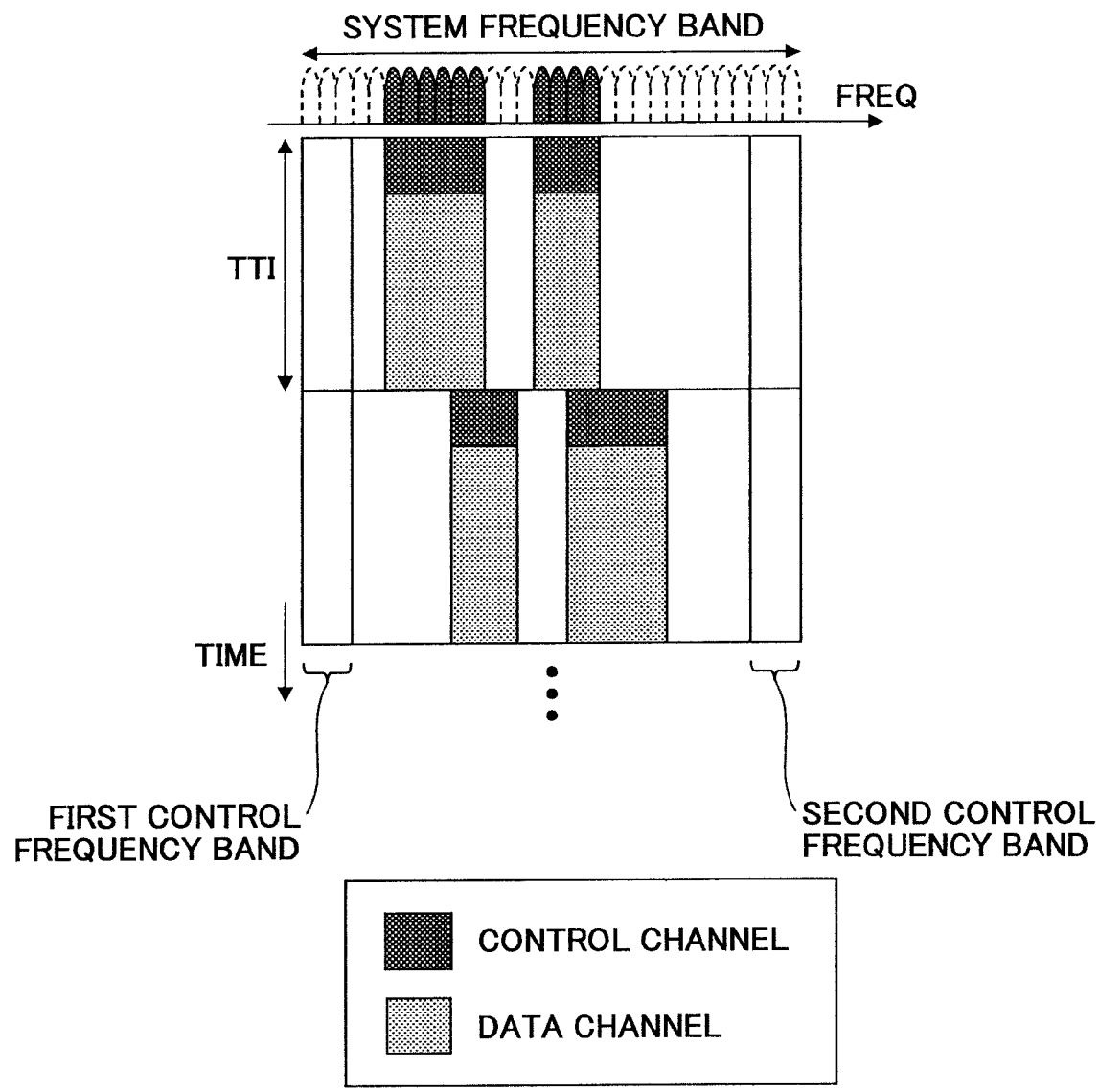
FIG. 17 is a drawing illustrating a control information transmission method (16)

FIG. 17 is a drawing illustrating a control information transmission method (16). Also in this method, control information is transmitted using the resource blocks of a data channel. In this method, however, the data channel is transmitted according to OFDM. Therefore, the data channel is transmitted using various subcarriers in the system frequency band.

<F. Using Frequency Band Different from Uplink Data Channel>

(Method 17)

Figure 18:
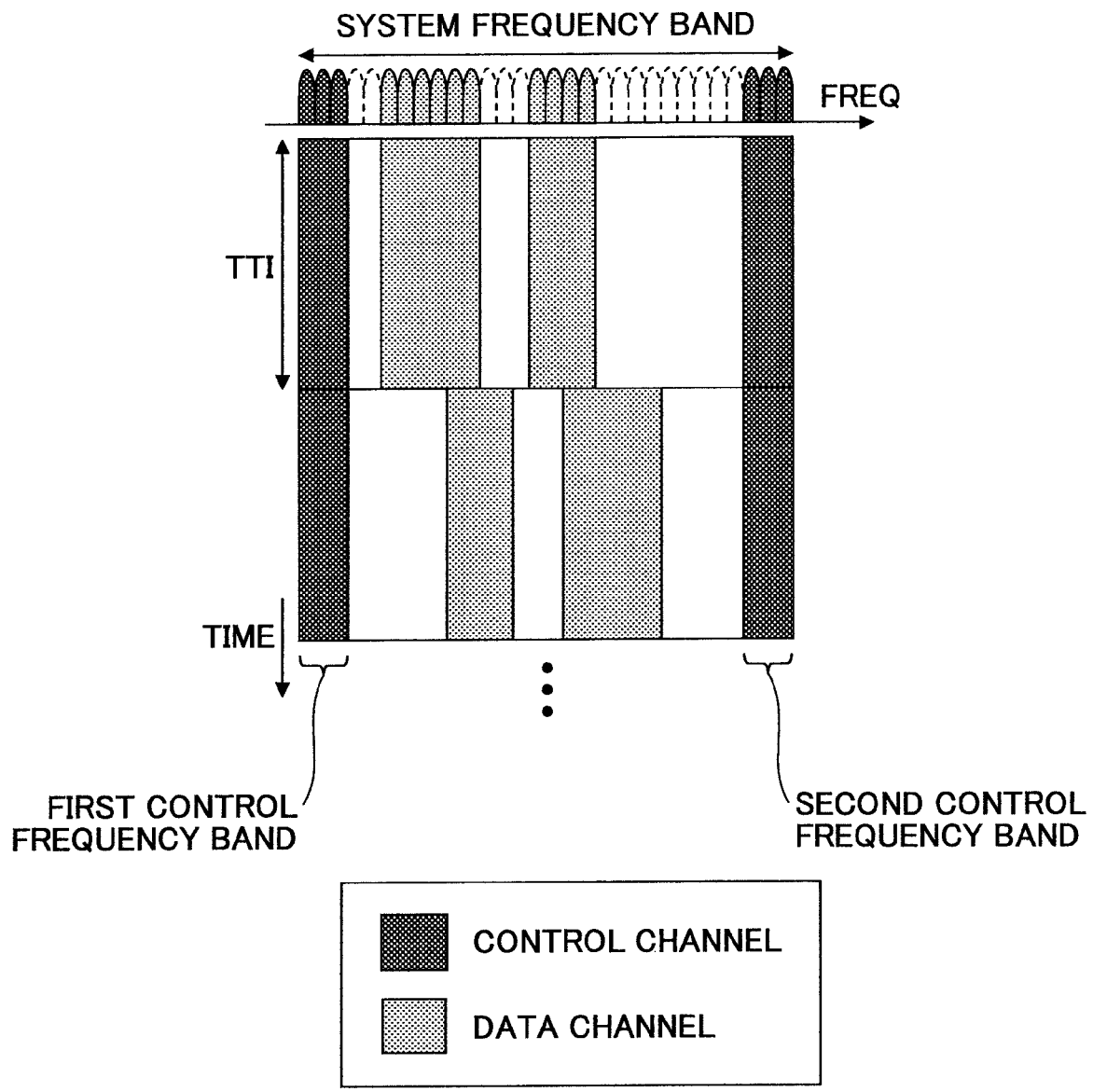
FIG. 18 is a drawing illustrating a control information transmission method (17)

FIG. 18 is a drawing illustrating a control information transmission method (17). In this method, control information is transmitted using the first and second control frequency bands and a data channel is transmitted using other frequency bands according to OFDM. Similarly to FIG. 4, control information is transmitted according to OFDM.

(Method 18)

Figure 19:
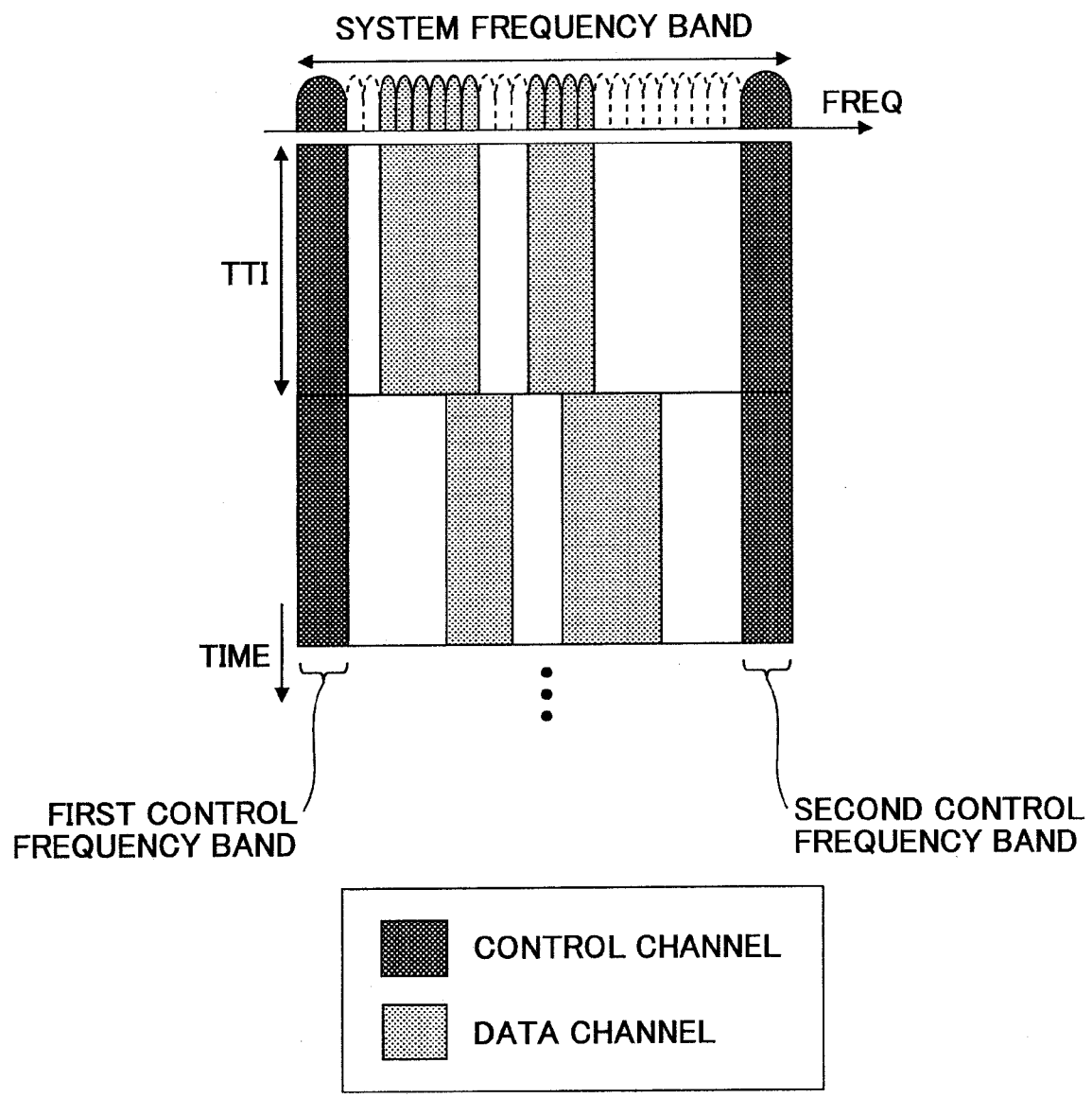
FIG. 19 is a drawing illustrating a control information transmission method (18)

FIG. 19 is a drawing illustrating a control information transmission method (18). Also in this method, control information is transmitted using the first and second control frequency bands and a data channel is transmitted using other frequency bands according to OFDM. Similarly to FIG. 9, control information is transmitted according to DFT-spread OFDM.

(Method 19)

Figure 20:
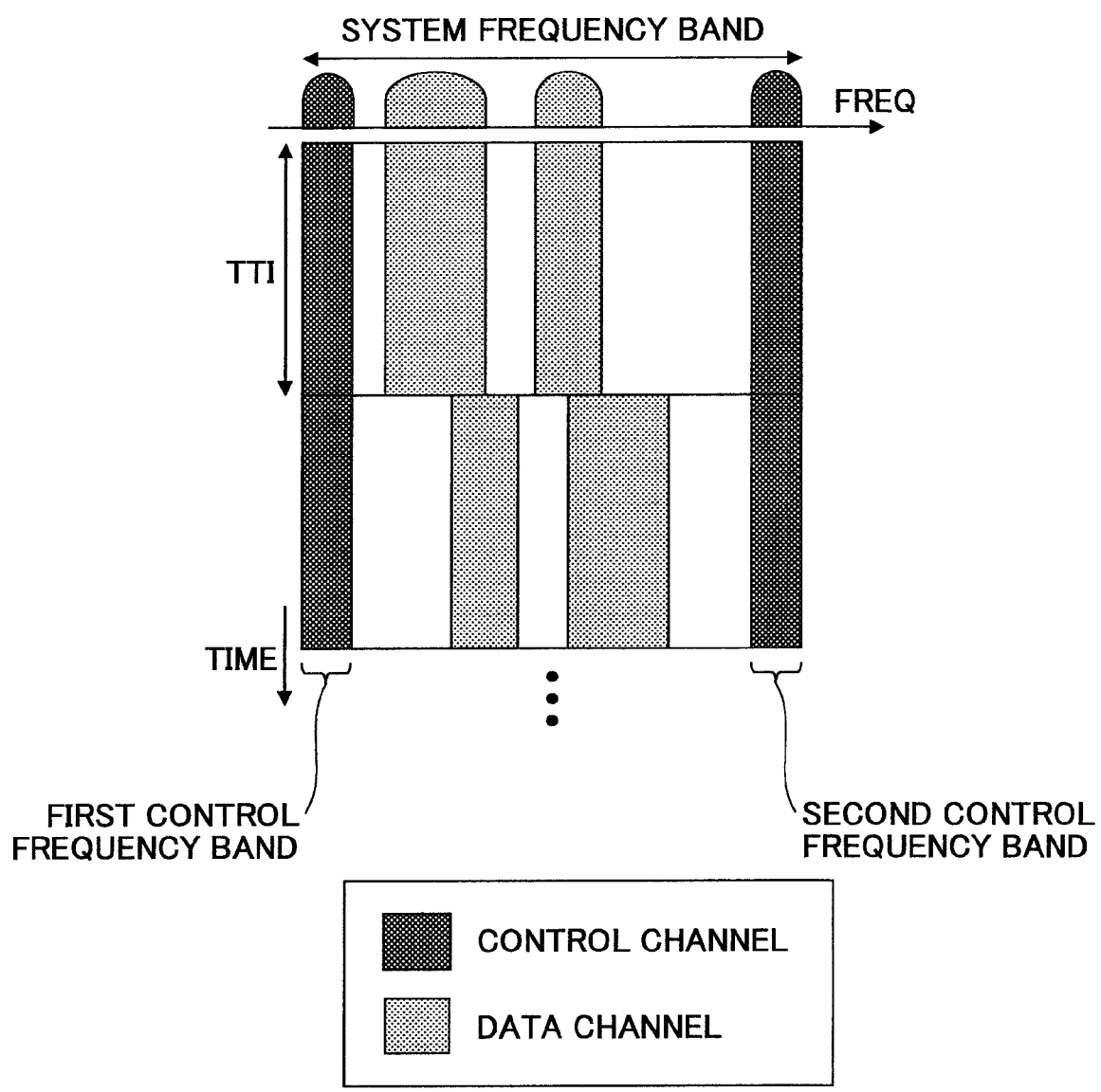
FIG. 20 is a drawing illustrating a control information transmission method (19)

FIG. 20 is a drawing illustrating a control information transmission method (19). Also in this method, control information is transmitted using the first and second control frequency bands. Similarly to FIG. 15, a data channel is transmitted using other frequency bands according to DFT-spread OFDM. Also, similarly to FIG. 9, control information is transmitted according to DFT-spread OFDM.

<G. Configuration of Control Channel (Block Modulation)>

Figure 21:
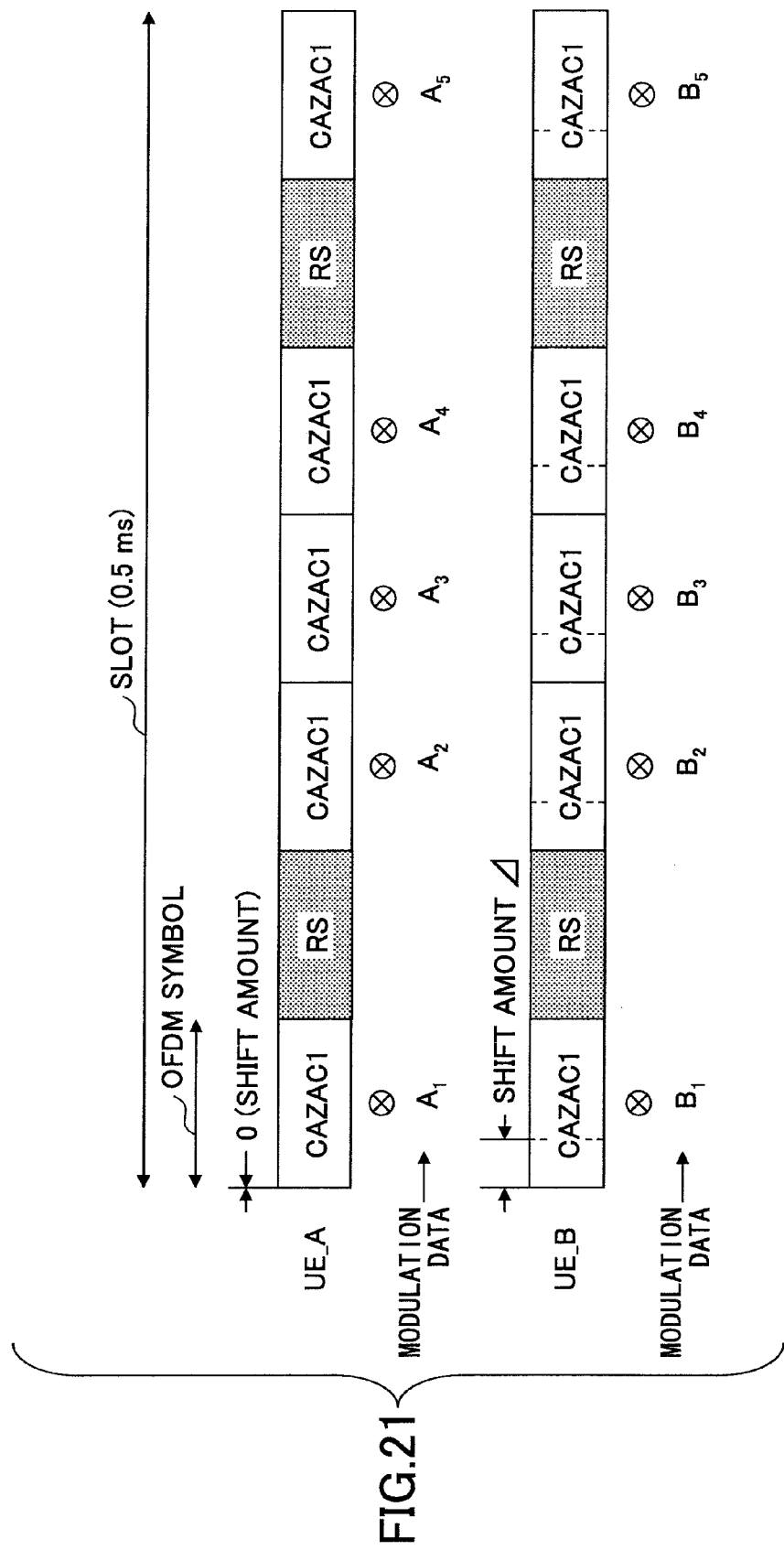
FIG. 21 is a drawing illustrating an exemplary configuration of a control channel.

FIG. 21 is a drawing illustrating an exemplary configuration of a control channel. In this example, it is assumed that one subframe (TTI) of 1 ms is divided into two slots of 0.5 ms, and each slot includes seven OFDM symbols. It is also assumed that two of the seven OFDM symbols are used for a pilot channel (reference signal). Accordingly, the remaining five OFDM symbols can be used to transmit information other than the pilot channel. As is obvious for a person skilled in the art, the length of a subframe, the number of slots, and the number of OFDM symbols may be changed as necessary.

In this example, each of the five OFDM symbols of user UE_A includes the same CAZAC code sequence CAZAC1. The CAZAC code sequence CAZAC1, for example, has a sequence length of 12. Code sequences obtained by cyclically shifting the CAZAC code sequence CAZAC1 are also CAZAC code sequences and are orthogonal to each other. In the example of FIG. 21, the above characteristics of CAZAC code sequences are used. An orthogonal code sequence used for another user UE_B is obtained by cyclically shifting the CAZAC code sequence CAZAC1 used for user UE_A by a shift amount $\varDelta$. The entire CAZAC code sequence CAZAC1 may be multiplied by the same factor. Even in this case, code sequences obtained by cyclically shifting the CAZAC code sequence CAZAC1 become orthogonal to each other. Modulation data A1 through modulation data A5 for user UE_A are prepared. The entire CAZAC code sequence CAZAC1 in a first OFDM symbol is multiplied by the modulation data A1. Similarly, the entire CAZAC code sequence CAZAC1 in each of second through fifth OFDM symbols is multiplied by a corresponding one of the modulation data A2 through A5. The modulation data A1 through A5 may be different from each other, or two or more of them may be the same. The modulation data, for example, represent the acknowledgement/negative-acknowledgement (ACK/NACK) information for a downlink data channel. Alternatively, the modulation data may represent a downlink channel quality indicator (CQI) measured based on a downlink pilot channel (downlink reference signal).

In this example, up to five sets of information can be transmitted for each user in one slot, and users are code-division-multiplexed using spreading codes with a sequence length of 12.

<H. Configuration of Control Channel (Non-Block Modulation)>

Figure 22:
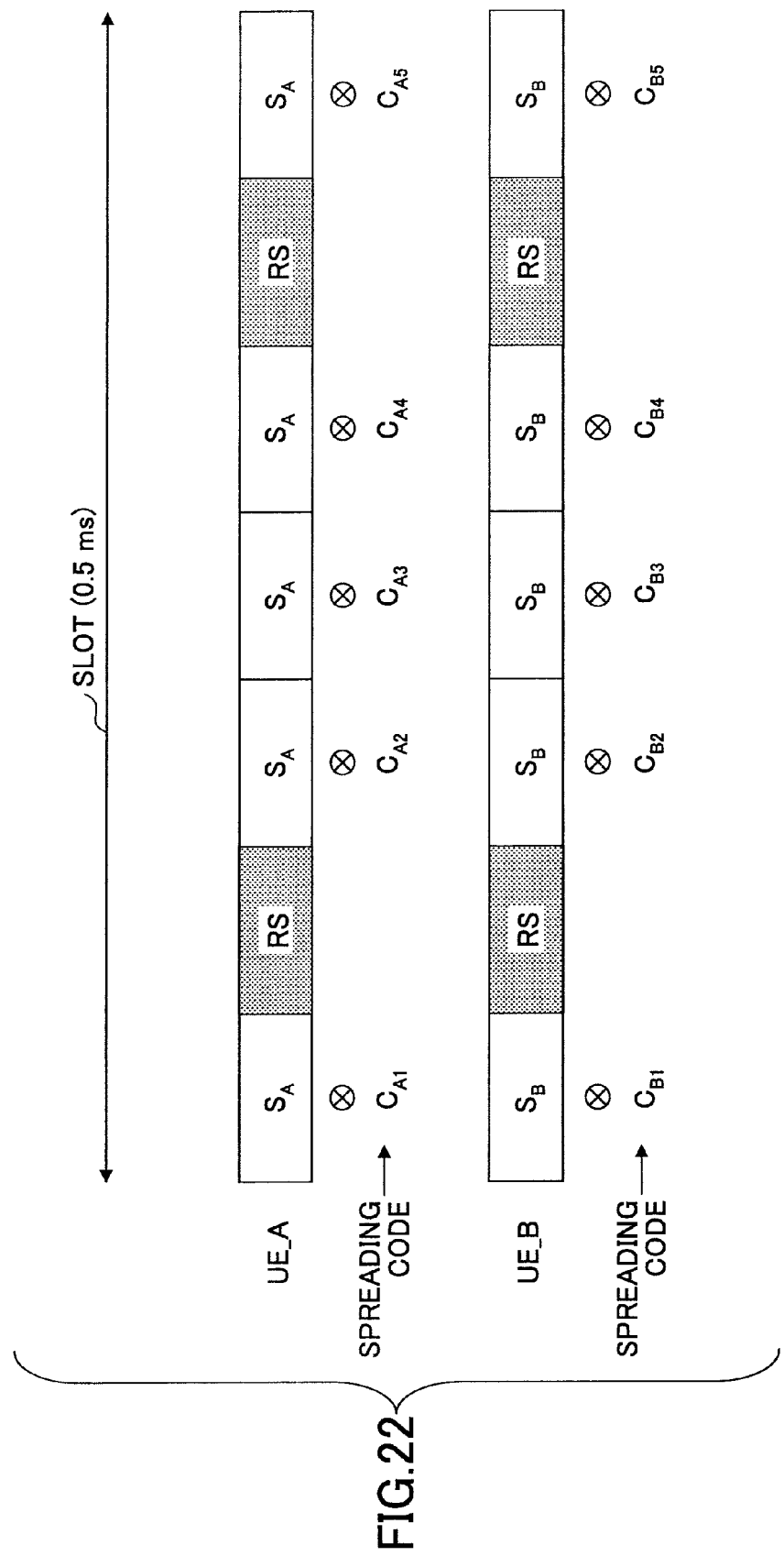
FIG. 22 is a drawing illustrating another exemplary configuration of a control channel.

FIG. 22 is a drawing illustrating an exemplary configuration of a control channel. The length of a subframe, the number of slots, and the number of OFDM symbols are based on the same assumption as in FIG. 21 and may be changed as necessary. In this example, it is also assumed that one OFDM symbol includes 12 symbol elements. In the example of FIG. 21, the 12 symbol elements correspond to the sequence elements of the CAZAC code sequence. Meanwhile, in the example of FIG. 22, 12 symbol elements SA in an OFDM symbol of user UE_A represent control information of user UE_A. Each of the five OFDM symbols of user UE_A includes 12 symbol elements SA. The five OFDM symbols are multiplied, respectively, by spreading codes CA1 through CA5 with a sequence length of 5. Similarly, 12 symbol elements SB in an OFDM symbol of user UE_B represent control information of user UE_B. Each of the five OFDM symbols of user UE_B includes 12 symbol elements SB. The five OFDM symbols are multiplied, respectively, by spreading codes CB1 through CB5 with a sequence length of 5.

In this example, up to 12 sets of information can be transmitted for each user in one slot, and users are code-division-multiplexed using spreading codes with a sequence length of 5. This method makes it possible to transmit a larger amount of information for each user.

<I. User Device>

Figure 23A:
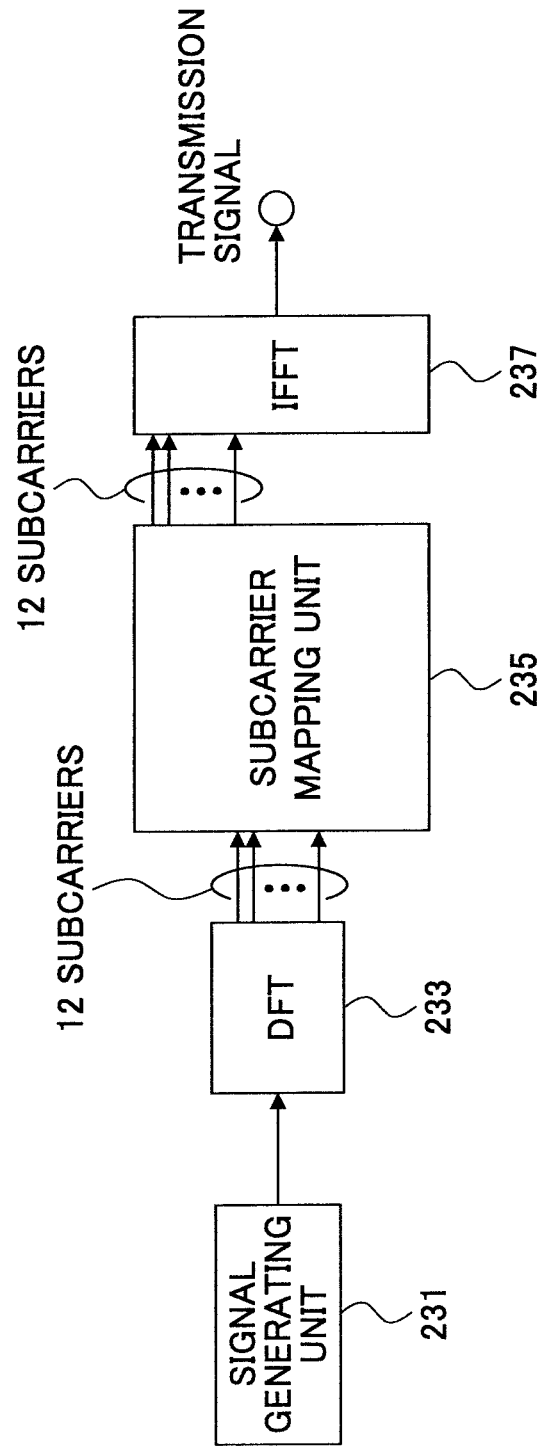
FIG. 23A is a partial functional block diagram of an exemplary user device.

FIG. 23A is a partial functional block diagram of an exemplary user device. As shown in FIG. 23A, the user device includes a signal generating unit 231, a discrete Fourier transform unit (DFT) 233, a subcarrier mapping unit 235, and an inverse fast Fourier transform unit (IFFT) 237.

The signal generating unit 231 generates a sequence for a transmission signal. This sequence is in the time domain. The signal generating unit 231 may be configured to generate any appropriate transmission signal. In a certain situation where a predetermined signal is to be transmitted, the signal generating unit 231 generates a signal sequence representing a CQI indicating a downlink reception level or quality even if the uplink shared data channel is not allocated to the user device. When acknowledgement/negative-acknowledgement information for a downlink shared data channel received via downlink is generated, the signal generating unit 231 generates a signal sequence representing the acknowledgement/negative-acknowledgement information. The acknowledgement/negative-acknowledgement information indicates either acknowledgement (ACK) or negative acknowledgement (NACK).

The discrete Fourier transform unit (DFT) 233 discrete-Fourier-transforms the time-domain signal sequence received from the signal generating unit 231 and thereby generates a frequency-domain signal sequence.

The subcarrier mapping unit 235 maps the frequency-domain signal sequence to a frequency band(s) (subcarrier(s)) available for uplink. Normally, the subcarrier mapping unit 235 maps the signal sequence to one or both of the first and second control frequency bands provided at the corresponding ends of the system frequency band. When a single-carrier scheme is used for uplink, the signal is mapped so as to occupy one continuous frequency band at any moment.

The inverse fast Fourier transform unit (IFFT) 237 inverse-fast-Fourier-transforms the mapped signal and thereby transforms the signal into a time-domain signal. Then, the time-domain signal is transmitted via a radio transmission unit (not shown).

Figure 23B:
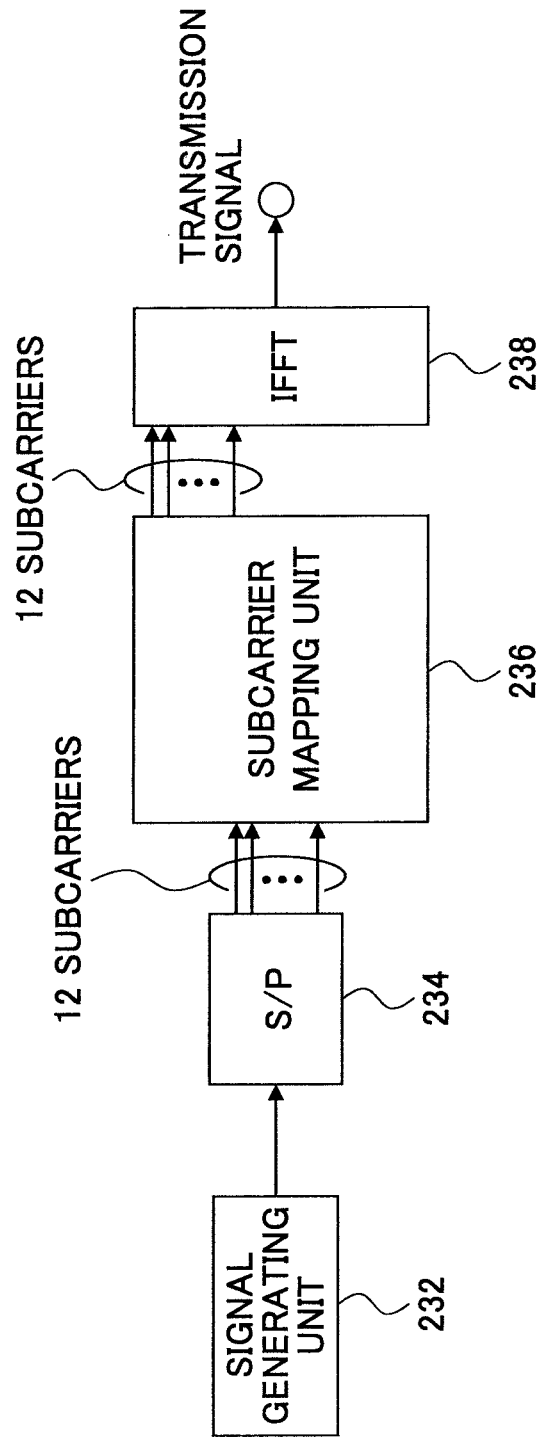
FIG. 23B is a partial functional block diagram of an exemplary user device.

FIG. 23B is a partial functional block diagram of another exemplary user device. In the user device of FIG. 23B, a signal generating unit 232 generates a transmission signal in the frequency domain. Therefore, the signal generated by the signal generating unit 232 is simply converted from serial to parallel by a serial-parallel conversion unit (S/P) 234 and input to a subcarrier mapping unit 236. The subcarrier mapping unit 236 and an inverse fast Fourier transform unit (IFFT) 238 have substantially the same functions as the corresponding components shown in FIG. 23A, and therefore their descriptions are omitted here.

In both of the user devices shown in FIGS. 23A and 23B, the subcarrier mapping unit 235,236 is configured to map a signal such that discontinuous frequency bands are not used at the same time. Therefore, the signal (control signal) can be transmitted using a single-carrier scheme. Accordingly, the user devices of FIGS. 23A and 23B can be used for a system where, for example, one of the transmission methods of FIGS. 2, 7B, 11, and 15 is employed.

FIG. 24A is a partial functional block diagram of an exemplary user device that can use both a single-carrier scheme and a multicarrier scheme to transmit a signal. As shown in FIG. 24A, the user device includes a signal generating unit 241, a serial-parallel conversion unit (S/P) 243, a subcarrier mapping unit 245, and an inverse fast Fourier transform unit (IFFT) 247.

The signal generating unit 241 generates a signal sequence in the frequency domain.

The serial-parallel conversion unit (S/P) 243 converts a serial signal sequence in the frequency domain into a parallel signal sequence.

The sub-carrier mapping unit 245 maps the signal in the frequency domain to subcarriers. The user device of FIG. 24A is capable of transmitting an uplink signal using a multicarrier scheme. The multicarrier signal may be generated according to OFDM or DFT-spread OFDM. When DFT-spread OFDM is employed, the user device of FIG. 24A is equivalent to the user devices of FIGS. 23A and 23B that can use a multicarrier scheme for uplink in addition to a single-carrier scheme.

The inverse fast Fourier transform unit (IFFT) 247 inverse-fast-Fourier-transforms the mapped signal and thereby transforms the mapped signal into a time-domain signal. Then, the time-domain signal is transmitted via a radio transmission unit (not shown).

Let us assume that a signal is transmitted by the transmission method shown in FIG. 3, and each of the first and second control frequency bands corresponds to one resource block that includes 12 subcarriers. In this case, the user device of FIG. 24A can transmit an uplink control signal using, at the maximum, a frequency band (12×2=24 subcarriers) corresponding to two resource blocks at the same time.

Figure 24B:
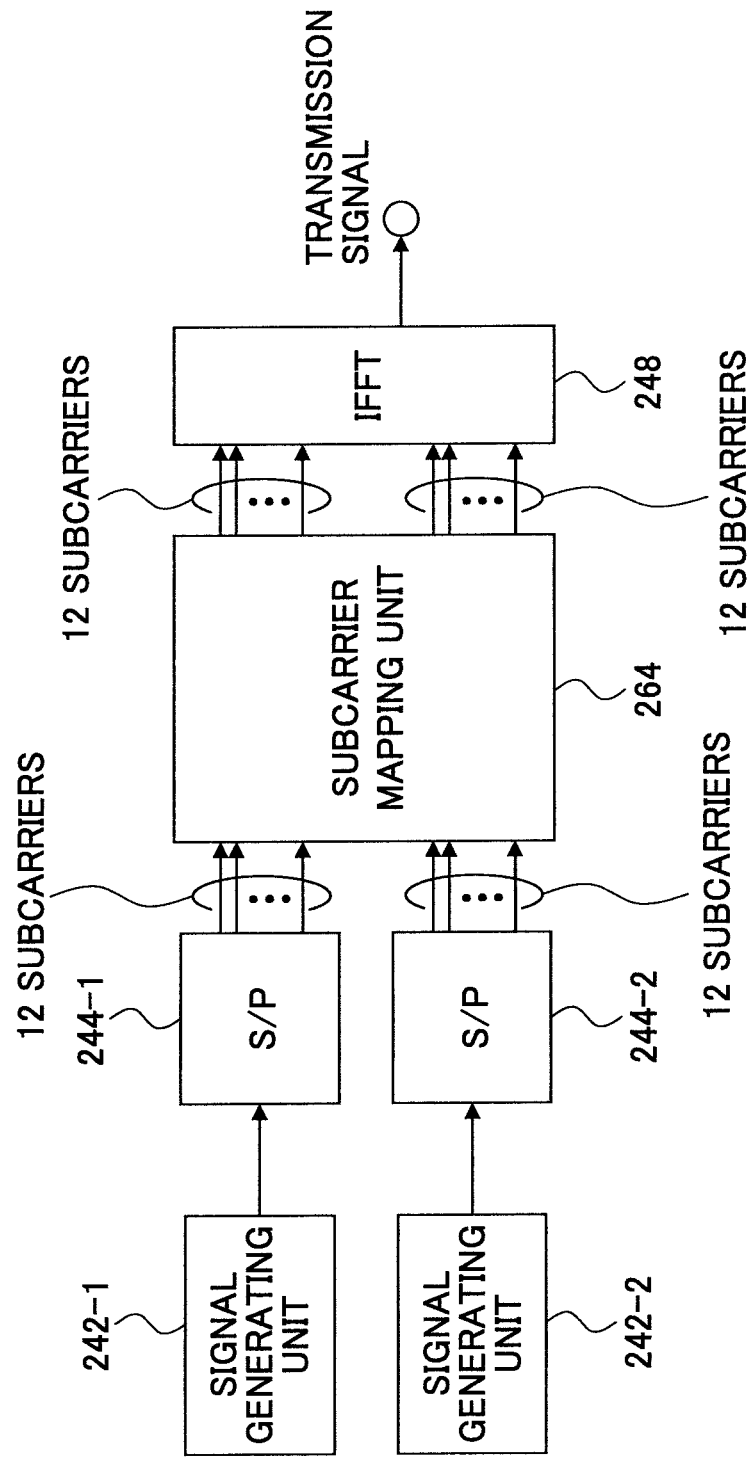
FIG. 24B is a partial functional block diagram of an exemplary user device.

FIG. 24B is a partial functional block diagram of still another exemplary user device. The user device of FIG. 24B is substantially the same as the user device of FIG. 24A except that a signal is generated for each resource block. Accordingly, radio transmission signals transmitted from the user devices of FIGS. 24A and 24B have similar waveforms. However, the user device of FIG. 24A can achieve higher code spreading gain and is therefore more preferable than the user device of FIG. 24B. With the user device of FIG. 24A, the maximum spreading factor in the frequency direction is 24 (24 subcarriers). Meanwhile, with the user device of FIG. 24B, the maximum spreading factor in the frequency direction is 12 (12 subcarriers). This difference has particularly great significance when spreading is performed two-dimensionally both in the time and frequency directions.

<J. Base Station>

Figure 25:
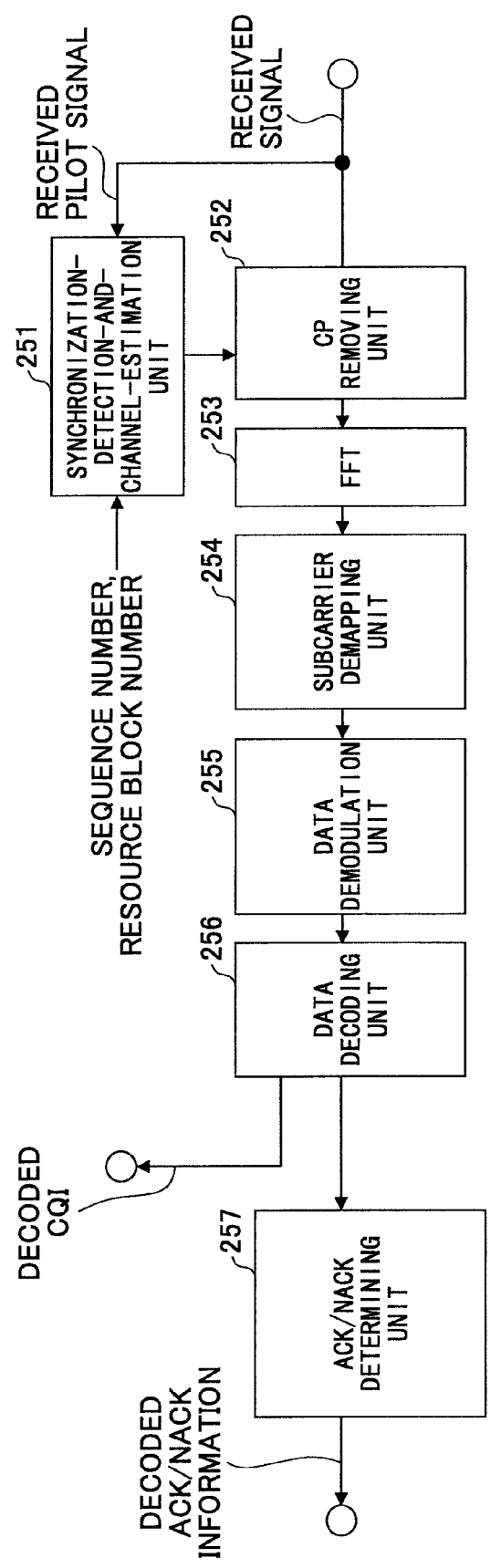
FIG. 25 is a partial functional block diagram of an exemplary base station.

FIG. 25 is a functional block diagram of a base station. As shown in FIG. 25, the base station includes a synchronization-detection-and-channel-estimation unit 251, a guard interval removing unit 252, a fast Fourier transform unit (FFT) 253, a subcarrier demapping unit 254, a data demodulation unit 255, a data decoding unit 256, and an ACK/NACK determining unit 257.

The synchronization-detection-and-channel-estimation unit 251 performs synchronization detection and channel estimation based on a pilot channel received via uplink.

The guard interval removing unit 252 removes guard intervals from a received signal according to the synchronization timing of the received signal.

The fast Fourier transform unit (FFT) 253 fast-Fourier-transforms the received signal and thereby transforms the received signal in the time domain into a signal in the frequency domain.

The subcarrier demapping unit 254 extracts a signal mapped to subcarriers. The signal may include only a control channel or both a control channel and a data channel.

The data demodulation unit 255 performs data demodulation on the received signal.

The data decoding unit 256 performs data decoding on the data-demodulated signal.

The data demodulation and the data decoding are performed for a control channel and a data channel separately. However, for brevity, those processes are represented collectively in FIG. 25.

The ACK/NACK determining unit 257 determines whether the uplink data channel has been properly received by, for example, performing error detection. For example, the error detection may be performed by cyclic redundancy check (CRC).

<Advantageous Effects of Embodiments>

An embodiment of the present invention provides a user device for a mobile communication system employing a multicarrier scheme. The user device includes a control signal generating unit generating a control signal and a transmitting unit transmitting the control signal to a base station. The control signal is mapped to multiple frequency bands that are provided across a subframe but discontinuous in the frequency domain. Each of the frequency bands includes subcarriers used in orthogonal frequency division multiplexing (OFDM). This configuration makes it possible to transmit the control signal using OFDM and thereby makes it possible to transmit a large amount of information and/or highly accurate information at high speed.

The control signal may be mapped to a subcarrier(s) allocated by frequency division multiple access (FDMA). This configuration makes it possible to accurately separate signals of multiple users.

The control signal may be spread by a spreading code used in code division multiple access (CDMA). This configuration makes it possible to increase the number of multiplexed users. The control signal may be two-dimensionally spread both in the time domain and the frequency domain.

The control signal may be transmitted in a time period allocated by time division multiple access (TDMA). This configuration makes it possible to accurately separate signals transmitted in different time periods.

A subframe may include a predetermined number of pilot transmission periods for transmitting a pilot channel and a predetermined number of information transmission periods for transmitting information other than the pilot channel. A signal including an orthogonal code sequence with a sequence length corresponding to the length of each of the information transmission periods may be transmitted in each of the information transmission periods and the entire orthogonal code sequence may be multiplied by (the same) one factor. This configuration makes it possible to distinguish users by orthogonal codes and thereby to reduce interference between users.

Alternatively, a subframe may include a first number of pilot transmission periods for transmitting a pilot channel and a second number of information transmission periods for transmitting information other than the pilot channel. A control signal may be transmitted in each of the second number of information transmission periods and the control signal may be multiplied by a spreading code having a sequence length that equals the second number. This configuration makes it possible to increase the amount of information that can be transmitted for each user.

The user device further includes a data signal generating unit generating a data signal. The data signal is mapped to multiple frequency bands provided separately from the frequency bands for the control signal. The frequency bands for the data signal are provided across a subframe but discontinuous in the frequency domain. Each of the frequency bands for the data signal may include subcarriers used in OFDM. This configuration makes it possible to transmit the control signal using OFDM and thereby makes it possible to transmit a large amount of information and/or highly accurate information at high speed.

An embodiment of the present invention provides a method performed by a user device for a mobile communication system employing a multicarrier scheme. The method includes a step of generating a control signal and a step of transmitting the control signal to a base station. The control signal is mapped to multiple frequency bands that are provided across a subframe but discontinuous in the frequency domain. Each of the frequency bands includes subcarriers used in orthogonal frequency division multiplexing (OFDM).

An embodiment of the present invention provides a base station for a mobile communication system employing a multicarrier scheme. The base station includes a receiving unit receiving a control signal from at least one user device and a restoring unit restoring the received control signal to an original signal before transmission (a pre-transmission signal). The control signal from the user device is extracted from multiple frequency bands that are provided across a subframe but discontinuous in the frequency domain. Each of the frequency bands includes subcarriers used in orthogonal frequency division multiplexing (OFDM).

The control signal may be despread by a spreading code used in code division multiple access (CDMA).

The control signal may be transmitted in a time period allocated by time division multiple access (TDMA).

The subframe may include a predetermined number of pilot transmission periods for transmitting a pilot channel and a predetermined number of information transmission periods for transmitting information other than the pilot channel. A signal including an orthogonal code sequence with a sequence length corresponding to the length of each of the information transmission periods may be received in each of the information transmission periods and the entire orthogonal code sequence may be multiplied by (the same) one factor. Alternatively, a subframe may include a first number of pilot transmission periods for transmitting a pilot channel and a second number of information transmission periods for transmitting information other than the pilot channel. A control signal may be received in each of the second number of information transmission periods and the control signal may be multiplied by a spreading code having a sequence length that equals the second number.

The base station may also receive a data signal from the user device. The data signal is extracted from multiple frequency bands provided separately from the frequency bands for the control signal. The frequency bands for the data signal are provided across a subframe but discontinuous in the frequency domain. Each of the frequency bands for the data signal may include subcarriers used in OFDM.

An embodiment of the present invention provides a method performed by a base station for a mobile communication system employing a multicarrier scheme. The method includes a step of receiving a control signal from at least one user device and a step of restoring the received control signal to an original signal before transmission. The control signal from the user device is extracted from multiple frequency bands that are provided across a subframe but discontinuous in the frequency domain. Each of the frequency bands may include subcarriers used in orthogonal frequency division multiplexing (OFDM).

The present invention may be applied to any appropriate mobile communication system where a multicarrier scheme is used for uplink. A mobile communication system employing a multicarrier scheme according to an embodiment of the present invention may be combined with any other appropriate mobile communication system. For example, a mobile communication system according to an embodiment of the present invention may be used together with an HSDPA/HSUPA W-CDMA system, an LTE system, an IMT-Advanced system, a WiMAX system, or a Wi-Fi system.

The present invention is not limited to the specifically disclosed embodiments, and variations and modifications may be made without departing from the scope of the present invention. Although specific values are used in the above descriptions to facilitate the understanding of the present invention, the values are just examples and different values may also be used unless otherwise mentioned. Although specific formulas are used in the above descriptions to facilitate the understanding of the present invention, the formulas are just examples and different formulas may also be used unless otherwise mentioned. The distinctions between the embodiments are not essential for the present invention, and the embodiments may be used individually or in combination. Although functional block diagrams are used to describe apparatuses in the above embodiments, the apparatuses may be implemented by hardware, software, or a combination of them.

The present international application claims priority from Japanese Patent Application No. 2008-163843 filed on Jun. 23, 2008, the entire contents of which are hereby incorporated herein by reference.

EXPLANATION OF REFERENCES

50 Cell
$100_1$, $100_2$, $100_3$ User device
200 Base station
300 Upper node
400 Core network
231 Signal generating unit
233 Discrete Fourier transform unit (DFT)
235 Subcarrier mapping unit
237 Inverse fast Fourier transform unit (IFFT)
232 Signal generating unit
234 Serial-parallel conversion unit (S/P)
236 Subcarrier mapping unit
238 Inverse fast Fourier transform unit
241 Signal generating unit
243 Serial-parallel conversion unit (S/P)
245 Subcarrier mapping unit
247 Inverse fast Fourier transform unit

The invention claimed is:

1. A user device for a mobile communication system employing a multicarrier scheme, the user device comprising:
a control signal generating unit generating a control signal;
a data signal generating unit generating a data signal; and
a transmitting unit transmitting the control signal and the data signal to a base station,
wherein the control signal is mapped to multiple frequency bands that are provided throughout a time period of a subframe but are separated from each other in a frequency domain;
wherein the control signal is two-dimensionally spread by a spreading code both in a time domain and in the frequency domain,
wherein the data signal is mapped to multiple frequency bands provided separately from the frequency bands for the control signal,
wherein the frequency bands for the data signal are provided throughout the time period of the subframe but are separated from each other in the frequency domain, wherein each of the frequency bands for the control signal and the data signal includes subcarriers used in orthogonal frequency division multiplexing,
wherein the subframe includes a first number of pilot transmission periods for transmitting a pilot channel and a second number of information transmission periods for transmitting information other than the pilot channel,
wherein OFDM symbols are used to transmit information other than the pilot channel where each OFDM symbol includes the same CAZAC code sequence and the entire CAZAC code sequence in a first OFDM symbol is multiplied by modulation data where the modulation data is representative of acknowledgment information for a downlink data channel;
wherein the control signal is transmitted in each of the second number of information transmission periods, and
wherein the control signal is multiplied by a spreading code having a sequence length that equals the second number,
wherein the control signal transmits control information comprising of at least uplink L1/L2 control information, acknowledgement/negative-acknowledgement (ACK/NACK) information for a data channel transmitted via downlink, and a channel quality indicator (CQI) indicating downlink channel conditions.

2. The user device as claimed in claim 1, wherein the control signal is mapped to subcarriers allocated by frequency division multiple access (FDMA).

3. The user device as claimed in claim 1, wherein the control signal is transmitted in a time period allocated by time division multiple access (TDMA).

4. The user device as claimed in claim 1, wherein
the subframe includes a predetermined number of pilot transmission periods for transmitting a pilot channel and a predetermined number of information transmission periods for transmitting information other than the pilot channel;
a signal including an orthogonal code sequence is transmitted in each of the information transmission periods; and
the orthogonal code sequence has a sequence length corresponding to a length of each of the information transmission periods and the entire orthogonal code sequence is multiplied by one factor.

5. A method performed by a user device for a mobile communication system employing a multicarrier scheme, the method comprising the steps of:
generating a control signal;
transmitting the control signal to a base station, wherein the control signal is mapped to multiple frequency bands that are provided throughout a time period of a subframe but are separated from each other in a frequency domain;
wherein the control signal is two dimensionally spread by a spreading code both in a time domain and in the frequency domain,
wherein the data signal is mapped to multiple frequency bands provided separately from the frequency bands for the control signal,
wherein the frequency bands for the data signal are provided throughout the time period of the subframe but are separated from each other in the frequency domain,
wherein each of the frequency bands for the control signal and the data signal includes subcarriers used in orthogonal frequency division multiplexing
wherein the subframe includes a first number of pilot transmission periods for transmitting a pilot channel and a second number of information transmission periods for transmitting information other than the pilot channel,
wherein OFDM symbols are used to transmit information other than the pilot channel where each OFDM symbol includes the same CAZAC code sequence and the entire CAZAC code sequence in a first OFDM symbol is multiplied by modulation data where the modulation data is representative of acknowledgment information for a downlink data channel;

wherein the control signal is transmitted in each of the second number of information transmission periods, and wherein the control signal is multiplied by a spreading code having a sequence length that equals the second number, wherein the control signal transmits control information comprising of at least uplink L1/L2 control information, acknowledgement/negative-acknowledgement (ACK/NACK) information for a data channel transmitted via downlink, and a channel quality indicator (CQI) indicating downlink channel conditions.

6. A base station for a mobile communication system employing a multicarrier scheme, the base station comprising:

a receiving unit receiving a control signal from at least one user device; and a restoring unit restoring the received control signal to an original signal before transmission, wherein the control signal from the at least one user device is extracted from multiple frequency bands that are provided throughout a time period of a subframe but are separated from each other in the frequency domain;

wherein the control signal from the at least one user device is two-dimensionally despread by a spreading code both in a time domain and in the frequency domain, wherein the base station also receives a data signal from the at least one user device, wherein the data signal is extracted from multiple frequency bands provided separately from the frequency bands of the control signal, wherein the frequency bands for the data signal are provided throughout the time period of the subframe but are separated from each other in the frequency domain, wherein each of the frequency bands for the control signal and the data signal includes subcarriers used in orthogonal frequency division multiplexing, wherein the subframe includes a first number of pilot transmission periods for transmitting a pilot channel and a second number of information transmission periods for transmitting information other than the pilot channel, wherein OFDM symbols are used to transmit information other than the pilot channel where each OFDM symbol includes the same CAZAC code sequence and the entire CAZAC code sequence in a first OFDM symbol is multiplied by modulation data where the modulation data is representative of acknowledgment information for a downlink data channel;

wherein the control signal is received in each of the second number of information transmission periods, and wherein the control signal is multiplied by a spreading code having a sequence length that equals the second number, wherein the control signal transmits control information comprising of at least uplink L1/L2 control information, acknowledgement/negative-acknowledgement (ACK/NACK) information for a data channel transmitted via downlink, and a channel quality indicator (CQI) indicating downlink channel conditions.

7. The base station as claimed in claim 6, wherein the control signal is transmitted in a time period allocated by time division multiple access (TDMA).

8. The base station as claimed in claim 6, wherein the subframe includes a predetermined number of pilot transmission periods for transmitting a pilot channel and a predetermined number of information transmission periods for transmitting information other than the pilot channel;

a signal including an orthogonal code sequence is received in each of the information transmission periods; and the orthogonal code sequence has a sequence length corresponding to a length of each of the information transmission periods and the entire orthogonal code sequence is multiplied by one factor.

9. A method performed by a base station for a mobile communication system employing a multicarrier scheme, the method comprising the steps of:

receiving a control signal from at least one user device; and restoring the received control signal to an original signal before transmission, wherein the control signal from the at least one user device is extracted from multiple frequency bands that are provided throughout a time period of a subframe but are separated from each other in the frequency domain;

wherein the control signal from the at least one user device is two-dimensionally despread by a spreading code both in a time domain and in the frequency domain, wherein the base station also receives a data signal from the at least one user device, wherein the data signal is extracted from multiple frequency bands provided separately from the frequency bands of the control signal, wherein the frequency bands for the data signal are provided throughout the time period of the subframe but are separated from each other in the frequency domain, wherein each of the frequency bands for the control signal and the data signal includes subcarriers used in orthogonal frequency division multiplexing, wherein the subframe includes a first number of pilot transmission periods for transmitting a pilot channel and a second number of information transmission periods for transmitting information other than the pilot channel, wherein OFDM symbols are used to transmit information other than the pilot channel where each OFDM symbol includes the same CAZAC code sequence and the entire CAZAC code sequence in a first OFDM symbol is multiplied by modulation data where the modulation data is representative of acknowledgment information for a downlink data channel;

wherein the control signal is received in each of the second number of information transmission periods, and wherein the control signal is multiplied by a spreading code having a sequence length that equals the second number, wherein the control signal transmits control information comprising of at least uplink L1/L2 control information, acknowledgement/negative-acknowledgement (ACK/NACK) information for a data channel transmitted via downlink, and a channel quality indicator (CQI) indicating downlink channel conditions.

* * * * *